US012309239B1

(12) United States Patent
Freilich et al.

(10) Patent No.: US 12,309,239 B1
(45) Date of Patent: *May 20, 2025

(54) SOFTWARE APPLICATION UPDATING IN A LOCAL NETWORK

(71) Applicant: Tanium Inc., Kirkland, WA (US)

(72) Inventors: Max Freilich, El Cerrito, CA (US); Andrew R. White, Apex, NC (US); Christian L. Hunt, Chapel Hill, NC (US); Peter Constantine, Bradford, RI (US); Peter Lincroft, Albany, CA (US)

(73) Assignee: Tanium Inc., Emeryville, CA (US)

( * ) Notice: Subject to any disclaimer, the term of this patent is extended or adjusted under 35 U.S.C. 154(b) by 317 days.

This patent is subject to a terminal disclaimer.

(21) Appl. No.: 17/683,213

(22) Filed: Feb. 28, 2022

Related U.S. Application Data

(63) Continuation of application No. 17/129,638, filed on Dec. 21, 2020, now Pat. No. 11,277,489, which is a
(Continued)

(51) Int. Cl.
H04L 67/568 (2022.01)
H04L 41/08 (2022.01)

(52) U.S. Cl.
CPC ............ *H04L 67/568* (2022.05); *H04L 41/08* (2013.01)

(58) Field of Classification Search
CPC . H04L 41/0813; H04L 41/0866; H04L 45/02; H04L 12/42; H04L 67/42; G06F 8/60; G06F 8/65; G06F 8/61; G06F 8/07
See application file for complete search history.

(56) References Cited

U.S. PATENT DOCUMENTS 5,220,596 A 6/1993 Patel
5,842,202 A 11/1998 Kon
(Continued)

FOREIGN PATENT DOCUMENTS

EP 1553747 A1 7/2005
EP 2493118 A1 8/2012
JP 2007-279978 A 10/2007

OTHER PUBLICATIONS

Non-Final Office Action, U.S. Appl. No. 18/516,882, Aug. 28, 2024, 11 pages.
(Continued)

*Primary Examiner* — Jerry B Dennison
(74) *Attorney, Agent, or Firm* — Nicholson De Vos Webster & Elliott LLP

(57) ABSTRACT

Software updates by computational machines in a distributed system are facilitated by a server system that receives a master update from a remote server outside to the distributed system. The server system, which is in the distributed system, generates from the master update a first group of update metadata comprising less than all of master update and sends to a first plurality of computational machines in the distributed system first update materials, including the first group of update metadata and first filter criteria specifying characteristics of computational machines that are to locally store the first group of update metadata. A respective computational machine that satisfies the first filter criteria locally stores the first group of update metadata, obtains first update files based on the first group of update metadata, and updates one or more software programs using the first update files.

25 Claims, 23 Drawing Sheets

Related U.S. Application Data continuation of application No. 16/565,247, filed on Sep. 9, 2019, now Pat. No. 10,873,645, which is a continuation-in-part of application No. 15/702,617, filed on Sep. 12, 2017, now Pat. No. 10,412,188, which is a continuation of application No. 14/554,739, filed on Nov. 26, 2014, now Pat. No. 9,769,275.

(60) Provisional application No. 62/880,610, filed on Jul. 30, 2019, provisional application No. 61/969,711, filed on Mar. 24, 2014.

(56) References Cited

U.S. PATENT DOCUMENTS

| | | |
|---|---|---|
| 5,949,755 A | 9/1999 | Uphadya et al. |
| 6,049,828 A | 4/2000 | Dev et al. |
| 6,055,545 A | 4/2000 | Yazaki et al. |
| 6,226,493 B1 | 5/2001 | Leopold et al. |
| 6,615,213 B1 | 9/2003 | Johnson |
| 6,879,979 B2 | 4/2005 | Hindawi et al. |
| 6,885,644 B1 | 4/2005 | Knop et al. |
| 6,959,000 B1 | 10/2005 | Lee et al. |
| 7,043,550 B2 | 5/2006 | Knop et al. |
| 7,096,503 B1 | 8/2006 | Magdych |
| 7,120,693 B2 | 10/2006 | Chang et al. |
| 7,225,243 B1 | 5/2007 | Wilson |
| 7,231,393 B1 | 6/2007 | Harik et al. |
| 7,240,044 B2 | 7/2007 | Chaudhuri et al. |
| 7,299,047 B2 | 11/2007 | Dolan et al. |
| 7,483,430 B1 | 1/2009 | Yuan et al. |
| 7,555,545 B2 | 6/2009 | McCasland |
| 7,600,018 B2 | 10/2009 | Maekawa et al. |
| 7,693,813 B1 | 4/2010 | Cao et al. |
| 7,698,453 B2 | 4/2010 | Samuels et al. |
| 7,702,614 B1 | 4/2010 | Shah et al. |
| 7,720,641 B2 | 5/2010 | Alagappan et al. |
| 7,761,557 B2 | 7/2010 | Fellenstein et al. |
| 7,769,848 B2 | 8/2010 | Choy et al. |
| 7,844,687 B1 | 11/2010 | Gelvin et al. |
| 7,870,613 B2 | 1/2011 | Porter et al. |
| 7,925,655 B1 | 4/2011 | Power et al. |
| 8,078,668 B2 | 12/2011 | Moreau |
| 8,086,594 B1 | 12/2011 | Cao et al. |
| 8,086,729 B1 | 12/2011 | Hindawi et al. |
| 8,139,508 B1 | 3/2012 | Roskind |
| 8,166,021 B1 | 4/2012 | Cao et al. |
| 8,166,045 B1 | 4/2012 | Mazumdar et al. |
| 8,185,612 B1 | 5/2012 | Arolovitch et al. |
| 8,185,615 B1 | 5/2012 | McDysan et al. |
| 8,271,522 B2 | 9/2012 | Mehul et al. |
| 8,392,530 B1 | 3/2013 | Manapragada et al. |
| 8,477,660 B2 | 7/2013 | Lee et al. |
| 8,504,879 B2 | 8/2013 | Poletto et al. |
| 8,510,562 B2 | 8/2013 | Ramakrishnan et al. |
| 8,650,160 B1 | 2/2014 | Beatty et al. |
| 8,677,448 B1 | 3/2014 | Kauffman et al. |
| 8,682,901 B1 | 3/2014 | Cao et al. |
| 8,813,228 B2 | 8/2014 | Magee et al. |
| 8,819,769 B1 | 8/2014 | Van Dijk |
| 8,885,521 B2 | 11/2014 | Wang et al. |
| 8,903,973 B1 | 12/2014 | Hindawi et al. |
| 8,904,039 B1 | 12/2014 | Hindawi et al. |
| 8,972,566 B1 | 3/2015 | Hindawi et al. |
| 9,009,827 B1 | 4/2015 | Albertson et al. |
| 9,059,961 B2 | 6/2015 | Hindawi et al. |
| 9,104,794 B2 | 8/2015 | Zakonov et al. |
| 9,246,977 B2 | 1/2016 | Hindawi et al. |
| 9,576,131 B2 | 2/2017 | Tuvell et al. |
| 9,609,007 B1 | 3/2017 | Rivlin et al. |
| 9,667,738 B2 | 5/2017 | Hindawi et al. |
| 9,716,649 B2 | 7/2017 | Bent et al. |
| 9,729,429 B2 | 8/2017 | Hindawi et al. |
| 9,769,037 B2 | 9/2017 | Hindawi et al. |
| 9,769,275 B2 | 9/2017 | Hindawi et al. |
| 9,800,603 B1 | 10/2017 | Sidagni et al. |
| 9,910,752 B2 | 3/2018 | Lippincott et al. |
| 9,973,525 B1 | 5/2018 | Roturier et al. |
| 9,985,982 B1 | 5/2018 | Bartos et al. |
| 9,998,955 B1 | 6/2018 | MacCarthaigh |
| 10,015,185 B1 | 7/2018 | Kolman et al. |
| 10,095,864 B2 | 10/2018 | Hunt et al. |
| 10,111,208 B2 | 10/2018 | Hindawi et al. |
| 10,136,415 B2 | 11/2018 | Hindawi et al. |
| 10,148,536 B2 | 12/2018 | Hindawi et al. |
| 10,261,770 B2 | 4/2019 | Devagupthapu et al. |
| 10,372,904 B2 | 8/2019 | Hunt et al. |
| 10,412,188 B2 | 9/2019 | Hindawi et al. |
| 10,482,242 B2 | 11/2019 | Hunt et al. |
| 10,484,429 B1 | 11/2019 | Fawcett |
| 10,498,744 B2 | 12/2019 | Hunt et al. |
| 10,649,870 B1 | 5/2020 | Lippincott et al. |
| 10,674,486 B2 | 6/2020 | Hindawi et al. |
| 10,708,116 B2 | 7/2020 | Hindawi et al. |
| 10,795,906 B1 | 10/2020 | Teubner |
| 10,824,729 B2 | 11/2020 | Hoscheit et al. |
| 10,841,365 B2 | 11/2020 | White et al. |
| 10,873,645 B2 | 12/2020 | Freilich et al. |
| 10,929,345 B2 | 2/2021 | Stoddard et al. |
| 11,032,298 B1 | 6/2021 | Robbins et al. |
| 11,100,199 B2 | 8/2021 | Subramaniam |
| 11,151,246 B2 | 10/2021 | Davis et al. |
| 11,153,383 B2 | 10/2021 | Richards et al. |
| 11,172,470 B1 | 11/2021 | Guieu et al. |
| 11,258,654 B1 | 2/2022 | Hindawi et al. |
| 11,277,489 B2 | 3/2022 | Freilich et al. |
| 11,301,568 B1 | 4/2022 | Dargude et al. |
| 11,343,355 B1 | 5/2022 | Goela et al. |
| 11,372,938 B1 | 6/2022 | Stoddard et al. |
| 11,461,208 B1 | 10/2022 | Lippincott et al. |
| 11,563,764 B1 | 1/2023 | Hoscheit et al. |
| 11,609,835 B1 | 3/2023 | Varga et al. |
| 11,700,303 B1 | 7/2023 | Richards et al. |
| 11,711,810 B1 | 7/2023 | Guieu et al. |
| 11,777,981 B1 | 10/2023 | Hoscheit et al. |
| 11,809,294 B1 | 11/2023 | Lippincott et al. |
| 11,831,670 B1 * | 11/2023 | Molls .................. G06F 8/65 |
| 11,886,229 B1 | 1/2024 | Goela et al. |
| 11,914,495 B1 | 2/2024 | Varga et al. |
| 11,956,335 B1 | 4/2024 | Goela et al. |
| 12,071,262 B2 | 8/2024 | Turner et al. |
| 2001/0056461 A1 | 12/2001 | Kampe et al. |
| 2002/0007404 A1 | 1/2002 | Vange et al. |
| 2002/0042693 A1 | 4/2002 | Kampe et al. |
| 2002/0073086 A1 | 6/2002 | Thompson et al. |
| 2002/0099952 A1 | 7/2002 | Lambert et al. |
| 2002/0198867 A1 | 12/2002 | Lohman et al. |
| 2003/0008712 A1 | 1/2003 | Poulin |
| 2003/0101253 A1 | 5/2003 | Saito et al. |
| 2003/0120603 A1 | 6/2003 | Kojima et al. |
| 2003/0131044 A1 | 7/2003 | Nagendra et al. |
| 2003/0212676 A1 | 11/2003 | Bruce et al. |
| 2003/0212821 A1 | 11/2003 | Gillies et al. |
| 2004/0037374 A1 | 2/2004 | Gonikberg |
| 2004/0044727 A1 | 3/2004 | Abdelaziz et al. |
| 2004/0044790 A1 | 3/2004 | Loach |
| 2004/0054723 A1 | 3/2004 | Dayal |
| 2004/0054889 A1 | 3/2004 | Pitsos |
| 2004/0064522 A1 | 4/2004 | Zhang |
| 2004/0076164 A1 | 4/2004 | Vanderveen et al. |
| 2004/0190085 A1 | 9/2004 | Silverbrook et al. |
| 2005/0004907 A1 | 1/2005 | Bruno et al. |
| 2005/0053000 A1 | 3/2005 | Oliver et al. |
| 2005/0108356 A1 | 5/2005 | Rosu et al. |
| 2005/0108389 A1 | 5/2005 | Kempin et al. |
| 2005/0195755 A1 | 9/2005 | Senta et al. |
| 2006/0039371 A1 | 2/2006 | Castro et al. |
| 2006/0128406 A1 | 6/2006 | Macartney |
| 2006/0133274 A1 | 6/2006 | Lee et al. |
| 2006/0282505 A1 | 12/2006 | Hasha et al. |
| 2007/0005738 A1 | 1/2007 | Alexion-Tiernan et al. |
| 2007/0083617 A1 | 4/2007 | Chakrabarti et al. |
| 2007/0171844 A1 | 7/2007 | Loyd et al. |
| 2007/0211651 A1 | 9/2007 | Ahmed et al. |

(56) References Cited

U.S. PATENT DOCUMENTS

| | | |
|---|---|---|
| 2007/0230482 A1 | 10/2007 | Shim et al. |
| 2007/0261051 A1 | 11/2007 | Porter et al. |
| 2008/0049631 A1 | 2/2008 | Morrill |
| 2008/0082628 A1 | 4/2008 | Rowstron et al. |
| 2008/0133582 A1 | 6/2008 | Andersch et al. |
| 2008/0258880 A1 | 10/2008 | Smith et al. |
| 2008/0263031 A1 | 10/2008 | George et al. |
| 2008/0288646 A1 | 11/2008 | Hasha et al. |
| 2008/0301256 A1 | 12/2008 | McWilliams et al. |
| 2009/0125639 A1 | 5/2009 | Dam et al. |
| 2009/0259518 A1 | 10/2009 | Harvey et al. |
| 2009/0271360 A1 | 10/2009 | Bestgen et al. |
| 2009/0285204 A1 | 11/2009 | Gallant et al. |
| 2009/0319503 A1 | 12/2009 | Mehul et al. |
| 2009/0328115 A1 | 12/2009 | Malik |
| 2010/0011060 A1 | 1/2010 | Hilterbrand et al. |
| 2010/0070570 A1 | 3/2010 | Lepeska |
| 2010/0085948 A1 | 4/2010 | Yu et al. |
| 2010/0094862 A1 | 4/2010 | Bent et al. |
| 2010/0154026 A1 | 6/2010 | Chatterjee et al. |
| 2010/0260178 A1 | 10/2010 | Huang et al. |
| 2010/0296416 A1 | 11/2010 | Lee et al. |
| 2010/0306252 A1 | 12/2010 | Jarvis et al. |
| 2011/0099562 A1 | 4/2011 | Nandy et al. |
| 2011/0138312 A1 | 6/2011 | Yeh et al. |
| 2011/0231431 A1 | 9/2011 | Kamiwada et al. |
| 2011/0271319 A1 | 11/2011 | Venable, Sr. |
| 2011/0299455 A1 | 12/2011 | Ordentlich et al. |
| 2012/0053957 A1 | 3/2012 | Atkins |
| 2012/0110183 A1 | 5/2012 | Miranda et al. |
| 2012/0221692 A1 | 8/2012 | Steiner et al. |
| 2012/0269096 A1 | 10/2012 | Roskind |
| 2012/0330700 A1 | 12/2012 | Garg et al. |
| 2013/0110931 A1 | 5/2013 | Kim et al. |
| 2013/0170336 A1 | 7/2013 | Chen et al. |
| 2013/0212296 A1 | 8/2013 | Goel et al. |
| 2013/0276053 A1 | 10/2013 | Hugard, IV et al. |
| 2013/0326494 A1 | 12/2013 | Nunez et al. |
| 2014/0075505 A1 | 3/2014 | Subramanian |
| 2014/0101133 A1 | 4/2014 | Carston et al. |
| 2014/0149557 A1 | 5/2014 | Lohmar et al. |
| 2014/0164290 A1 | 6/2014 | Salter |
| 2014/0164552 A1 | 6/2014 | Kim et al. |
| 2014/0181247 A1 | 6/2014 | Hindawi et al. |
| 2014/0181295 A1 | 6/2014 | Hindawi et al. |
| 2014/0244727 A1 | 8/2014 | Kang et al. |
| 2014/0279044 A1 | 9/2014 | Summers |
| 2014/0280280 A1 | 9/2014 | Singh |
| 2014/0282586 A1 | 9/2014 | Shear |
| 2014/0372533 A1 | 12/2014 | Fu et al. |
| 2014/0375528 A1 | 12/2014 | Ling |
| 2015/0058619 A1 | 2/2015 | Sweet et al. |
| 2015/0080039 A1 | 3/2015 | Ling et al. |
| 2015/0149624 A1 | 5/2015 | Hindawi et al. |
| 2015/0163121 A1 | 6/2015 | Mahaffey et al. |
| 2015/0172228 A1 | 6/2015 | Zalepa et al. |
| 2015/0199511 A1 | 7/2015 | Faile et al. |
| 2015/0199629 A1 | 7/2015 | Faile et al. |
| 2015/0256575 A1 | 9/2015 | Scott |
| 2015/0302458 A1 | 10/2015 | Dides |
| 2015/0312335 A1 | 10/2015 | Ying |
| 2015/0372911 A1 | 12/2015 | Yabusaki et al. |
| 2015/0373043 A1 | 12/2015 | Wang et al. |
| 2015/0378743 A1 | 12/2015 | Zellermayer et al. |
| 2016/0034692 A1 | 2/2016 | Singler |
| 2016/0080408 A1 | 3/2016 | Coleman et al. |
| 2016/0119251 A1 | 4/2016 | Solis et al. |
| 2016/0255142 A1 | 9/2016 | Hunt et al. |
| 2016/0255143 A1 | 9/2016 | Hunt et al. |
| 2016/0269434 A1 | 9/2016 | DiValentin et al. |
| 2016/0286540 A1 | 9/2016 | Hindawi et al. |
| 2016/0352588 A1 | 12/2016 | Subbarayan et al. |
| 2016/0360006 A1 | 12/2016 | Hopkins et al. |
| 2016/0378450 A1 | 12/2016 | Fu et al. |
| 2017/0093915 A1 | 3/2017 | Ellis et al. |
| 2017/0118074 A1 | 4/2017 | Feinstein et al. |
| 2017/0133843 A1 | 5/2017 | McNeill-McCallum et al. |
| 2017/0257432 A1 | 9/2017 | Fu et al. |
| 2017/0286690 A1 | 10/2017 | Chari |
| 2017/0346824 A1 | 11/2017 | Mahabir |
| 2018/0013768 A1 | 1/2018 | Hunt et al. |
| 2018/0039486 A1 | 2/2018 | Kulkarni et al. |
| 2018/0074483 A1 | 3/2018 | Cruz |
| 2018/0074796 A1 | 3/2018 | Alabes et al. |
| 2018/0191747 A1 | 7/2018 | Nachenberg et al. |
| 2018/0191766 A1 | 7/2018 | Holeman et al. |
| 2018/0267794 A1 | 9/2018 | Atchison et al. |
| 2018/0351792 A1 | 12/2018 | Hunter et al. |
| 2018/0351793 A1 | 12/2018 | Hunter et al. |
| 2018/0375892 A1 | 12/2018 | Ganor |
| 2019/0081981 A1 | 3/2019 | Bansal |
| 2019/0096217 A1 | 3/2019 | Pourmohammad et al. |
| 2019/0138512 A1 | 5/2019 | Pourmohammad et al. |
| 2019/0260638 A1 | 8/2019 | Yocam et al. |
| 2019/0280867 A1 | 9/2019 | Kurian |
| 2019/0319987 A1 | 10/2019 | Levy |
| 2019/0361843 A1 | 11/2019 | Stoddard et al. |
| 2020/0028890 A1 | 1/2020 | White et al. |
| 2020/0053072 A1 | 2/2020 | Glozman et al. |
| 2020/0195693 A1 | 6/2020 | Price |
| 2020/0198867 A1 | 6/2020 | Nakamichi |
| 2020/0202007 A1 | 6/2020 | Nagaraja et al. |
| 2020/0304536 A1 | 9/2020 | Mahabir |
| 2021/0027401 A1 | 1/2021 | Hovhannisyan et al. |
| 2021/0218711 A1 | 7/2021 | Biran et al. |
| 2022/0272084 A1 | 8/2022 | Hyatt |
| 2023/0036694 A1* | 2/2023 | Coughlan ............ G06Q 20/385 |
| 2023/0058040 A1 | 2/2023 | Nevius et al. |
| 2023/0360040 A1 | 11/2023 | Childe et al. |

OTHER PUBLICATIONS

Notice of Allowance, U.S. Appl. No. 13/301,250, Oct. 24, 2014, 8 pages.
Notice of Allowance, U.S. Appl. No. 13/797,962, Feb. 17, 2015, 10 pages.
Notice of Allowance, U.S. Appl. No. 14/530,601, Apr. 5, 2017, 8 pages.
Notice of Allowance, U.S. Appl. No. 14/553,769, May 19, 2017, 6 pages.
Notice of Allowance, U.S. Appl. No. 14/554,711, Jan. 27, 2017, 22 pages.
Notice of Allowance, U.S. Appl. No. 14/554,739, May 9, 2017, 20 pages.
Notice of Allowance, U.S. Appl. No. 15/174,850, Jun. 20, 2018, 39 pages.
Notice of Allowance, U.S. Appl. No. 15/215,483, Jun. 7, 2018, 9 pages.
Notice of Allowance, U.S. Appl. No. 15/668,665, Mar. 2, 2020, 7 pages.
Notice of Allowance, U.S. Appl. No. 15/686,054, Jul. 18, 2018, 6 pages.
Notice of Allowance, U.S. Appl. No. 15/702,617, Apr. 23, 2019, 24 pages.
Notice of Allowance, U.S. Appl. No. 15/713,518, Jul. 29, 2019, 13 pages.
Notice of Allowance, U.S. Appl. No. 15/878,286, Jan. 10, 2020, 6 pages.
Notice of Allowance, U.S. Appl. No. 15/930,342, Mar. 24, 2022, 8 pages.
Notice of Allowance, U.S. Appl. No. 16/033,131, Jun. 30, 2020, 27 pages.
Notice of Allowance, U.S. Appl. No. 16/194,240, Aug. 14, 2019, 10 pages.
Notice of Allowance, U.S. Appl. No. 16/194,240, Mar. 2, 2020, 9 pages.
Notice of Allowance, U.S. Appl. No. 16/194,240, Nov. 7, 2019, 10 pages.
Notice of Allowance, U.S. Appl. No. 16/430,336, Aug. 7, 2020, 28 pages.

(56) References Cited

OTHER PUBLICATIONS

Notice of Allowance, U.S. Appl. No. 16/430,336, Sep. 3, 2020, 5 pages.
Notice of Allowance, U.S. Appl. No. 16/565,247, Aug. 17, 2020, 19 pages.
Notice of Allowance, U.S. Appl. No. 16/943,307, Nov. 8, 2022, 11 pages.
Notice of Allowance, U.S. Appl. No. 16/943,307, Oct. 6, 2022, 12 pages.
Notice of Allowance, U.S. Appl. No. 16/952,009, Jul. 25, 2023, 8 pages.
Notice of Allowance, U.S. Appl. No. 16/952,009, Mar. 28, 2023, 8 pages.
Notice of Allowance, U.S. Appl. No. 17/001,586, Sep. 8, 2022, 8 pages.
Notice of Allowance, U.S. Appl. No. 17/751,504, Nov. 21, 2023, 12 pages.
Notice of Allowance, U.S. Appl. No. 18/099,854, May 26, 2023, 12 pages.
Notice of Allowance, U.S. Appl. No. 18/123,930, Nov. 7, 2023, 11 pages.
Notice of Allowance, U.S. Appl. No. 18/204,351, Jun. 21, 2024, 10 pages.
Notice of Allowance, U.S. Appl. No. 18/225,620, Jul. 18, 2024, 7 pages.
Peter Kairouz et al., "Advances and Open Problems in Federated Learning," 2021, 121 pages, arXIV:1912.04977v3.
Requirement for Restriction/Election, U.S. Appl. No. 12/412,623, Nov. 22, 2010, 5 pages.
Requirement for Restriction/Election, U.S. Appl. No. 13/107,625, Oct. 11, 2013, 6 pages.
Supplemental Notice of Allowability, U.S. Appl. No. 16/870,742, Apr. 11, 2022, 2 pages.
Trevor Hastie et al., "The Elements of Statistical Learning, Data Mining, Inference, and Prediction," 2001, 545 pages, Springer.
Trevor Hastie et al., "The Elements of Statistical Learning, Data Mining, Inference, and Prediction," 2008, 764 pages, Second Edition, Springer.
Abdalkarim Awad et al., "Virtual Cord Protocol (VCP): A Flexible DHT-like Routing Service for Sensor Networks", In Proceedings of the 5th IEEE International Conference on Mobile Ad Hoc and Sensor Systems, 2008, 10 pp. 133-142.
Hood, Proactive Network-Fault Detection, Sep. 1997, 9 pages.
Mongeau et al., "Ensuring integrity of network inventory and configuration data", Telecommunications Network Strategy and Planning Symposium, Networks 2004, 11th International Vienna, Austria, Jun. 13-16, 2004, 6 pgs.
Weixiong Rao et al., "Optimal Resource Placement in Structured Peer-to-Peer Networks," Jul. 2010, IEEE Transactions on Parallel and Distributed Systems, vol. 21, No. 7, 16 pgs.
Tanium Inc., International Search Report and Written Opinion, PCT/US2013/076971, Apr. 4, 2014, 19 pgs.
Tanium Inc., International Preliminary Report on Patentability, PCT/US2013/076971, Jun. 23, 2015, 14 pgs.
Tanium Inc., International Search Report and Written Opinion, PCT/US2014/067607, Feb. 18, 2015, 15 pgs.
Tanium Inc., International Preliminary Report on Patentability, PCT/US2014/067607, May 31, 2016, 11 pgs.
Tanium Inc., International Search Report and Written Opinion, PCT/US2015/020780, Jul. 2, 2015, 13 pgs.
Tanium Inc., International Preliminary Report on Patentability, PCT/US2015/020780, Sep 27, 2016, 9 pgs.
Hindawi, Non-Final Office Action, U.S. Appl. No. 15/702,617, Jun. 1, 2018, 37 pgs.
Hindawi, Final Office Action, U.S. Appl. No. 15/702,617, Dec. 27, 2018, 54 pgs.
Hunt, Non-Final Office Action, U.S. Appl. No. 15/215,468, Oct. 4, 2018, 13 pgs.
Hunt, Notice of Allowance, U.S. Appl. No. 15/215,468, Jan. 24, 2019, 8 pgs.
Hunt, Notice of Allowance, U.S. Appl. No. 15/215,468, Apr. 1, 2019, 8 pgs.
Hunt, Non-Final Office Action, U.S. Appl. No. 15/215,474, Sep. 10, 2018, 10 pgs.
Hunt, Final Office Action, U.S. Appl. No. 15/215,474, Apr. 1, 2019, 7 pgs.
Hunt, Notice of Allowance, U.S. Appl. No. 15/215,474, Jul. 11, 2019, 9 pgs.
Hunt, Notice of Allowance, U.S. Appl. No. 15/713,518, Apr. 10, 2019, 14 pgs.
Lippincott, Notice of Allowance, U.S. Appl. No. 15/878,286, Apr. 25, 2019, 11 pgs.
Jae Woo Lee et al., "0 to 10k in 20 Seconds: Bootstrapping Large-Scale DHT Networks", 2011 IEE International Conference on Communications, Jun. 9, 2011, pp. 1-6.
Stoica et al., "Chord: A Scalable Peer-to-Peer Lookup Service for Internet Applications", 2001, pp. 1-12 (Year: 2002).
Ping Wang et al., "Peer-to-Peer Botnets: The Next Generation of Botnet Attacks", Jan. 2010, pp. 1-25 (Year: 2010).
Sean Rhea et al., "Handling Churn in a DHT", 2004, pp. 1-14 (Year: 2004).
Richards, Non-Final Office Action, U.S. Appl. No. 16/443,720, Sep. 4, 2020, 13 pgs.
Richards, Notice of Allowance, U.S. Appl. No. 16/443,720, Feb. 9, 2021, 8 pgs.
Richards, Notice of Allowance, U.S. Appl. No. 16/443,720, Jun. 15, 2021, 7 pgs.
Goela, Non-Final Office Action, U.S. Appl. No. 16/943,291, Jul. 16, 2021, 19 pgs.
Freilich, Non-Final Office Action, U.S. Appl. No. 17/129,638, Jul. 23, 2021, 7 pgs.
Richards, Corrected Notice of Allowability, U.S. Appl. No. 16/443,720, Aug. 4, 2021, 2 pgs.
Goela, Notice of Allowance, U.S. Appl. No. 16/943,291, Oct. 1, 2021, 11 pgs.
Hindawi, Non-Final Office Action, U.S. Appl. No. 16/917,800, Jul. 1, 2021, 7 pgs.
Hindawi, Notice of Allowance, U.S. Appl. No. 16/917,800, Oct. 15, 2021, 7 pgs.
Goela, Notice of Allowance, U.S. Appl. No. 16/943,291, Oct. 18, 2021, 5 pgs.
Hoscheit, Non-Final Office Action, U.S. Appl. No. 17/001,586, Jun. 9, 2022, 7 pgs.
Freilich, Notice of Allowance, U.S. Appl. No. 17/129,638, Nov. 4, 2021, 9 pgs.
Stoddard, Non-Final Office Action, U.S. Appl. No. 16/870,742, Oct. 28, 2021, 7 pgs.
Stoddard, Notice of Allowance, U.S. Appl. No. 16/870,742, Mar. 7, 2022, 10 pgs.
Goela, Notice of Allowance, U.S. Appl. No. 16/943,291, Jan. 27, 2022, 12 pgs.
Lippincott, Notice of Allowance, U.S. Appl. No. 15/878,286, Jul. 31, 2019, 5 pgs.
Lippincott, Notice of Allowance, U.S. Appl. No. 15/136,790, Nov. 20, 2017, 9 pgs.
Lippincott, Notice of Allowance, U.S. Appl. No. 15/930,342, May 25, 2022, 9 pgs.
Guieu, Non-Final Office Action, U.S. Appl. No. 17/521,686, Oct. 4, 2022, 38 pages.
Guieu, Notice of Allowance, U.S. Appl. No. 16/854,844, Jul. 6, 2021, 16 pages.
Hindawi, Non-Office Action, U.S. Appl. No. 13/797,946, Feb. 27, 2015, 18 pgs.
Hindawi, Notice of Allowance, U.S. Appl. No. 13/797,946, Sep. 11, 2015, 18 pgs.
Hindawi, Notice of Allowance, U.S. Appl. No. 15/004,757, Jul. 16, 2018, 7 pages.
Hindawi, Notice of Allowance, U.S. Appl. No. 16/194,240, Mar. 31, 2020, 6 pages.
Stoddard, Notice of Allowance, U.S. Appl. No. 16/532,391, Oct. 21, 2020, 10 pages.
Freilich, Notice of Allowance, U.S. Appl. No. 16/565,247, Oct. 15, 2020, 10 pages.

(56) References Cited

OTHER PUBLICATIONS

Freilich, Notice of Allowance, U.S. Appl. No. 17/503,023, Feb. 24, 2023, 8 pages.
Guieu et al., Notice of Allowance, U.S. Appl. No. 17/521,686, Mar. 3, 2023, 8 pages.
Lippincott et al., Notice of Allowance, U.S. Appl. No. 17/959,177, Mar. 28, 2023, 9 pages.
Lippincott et al., Notice of Allowance, U.S. Appl. No. 17/959,177, Jun. 21, 2023, 9 pages.
Daniel Varga et al., Non-Final Office Action, U.S. Appl. No. 18/123,930, Jun. 14, 2023, 7 pgs.
Naveen Goela et al., Non-Final Office Action, U.S. Appl. No. 17/182,083, Apr. 27, 2023, 7 pgs.
Naveen Goela et al., Notice of Allowance, U.S. Appl. No. 17/182,083, Sep. 20, 2023, 8 pgs.
Non-Final Office Action, U.S. Appl. No. 18/440,922, Sep. 5, 2024, 14 pages.
"Total Carbon Accounting: A Framework to Deliver Locational Carbon Intensity Data", White Paper, Nov. 2021, 29 pages.
Corrected Notice of Allowability, U.S. Appl. No. 15/004,757, Aug. 24, 2018, 4 pages.
Corrected Notice of Allowability, U.S. Appl. No. 15/174,850, Jul. 25, 2018, 37 pages.
Corrected Notice of Allowability, U.S. Appl. No. 16/430,336, Oct. 15, 2020, 2 pages.
Corrected Notice of Allowability, U.S. Appl. No. 16/917,800, Dec. 16, 2021, 2 pages.
Corrected Notice of Allowability, U.S. Appl. No. 16/917,800, Nov. 18, 2021, 2 pages.
Corrected Notice of Allowability, U.S. Appl. No. 16/917,800, Oct. 25, 2021, 2 pages.
Corrected Notice of Allowability, U.S. Appl. No. 16/943,291, Apr. 11, 2022, 2 pages.
Corrected Notice of Allowability, U.S. Appl. No. 16/943,291, Feb. 25, 2022, 2 pages.
Corrected Notice of Allowability, U.S. Appl. No. 18/099,854, Jun. 5, 2023, 7 pages.
Final Office Action, U.S. Appl. No. 13/084,923, Jul. 1, 2013, 10 pages.
Final Office Action, U.S. Appl. No. 15/004,757, Dec. 29, 2017, 27 pages.
Final Office Action, U.S. Appl. No. 15/668,665, Dec. 10, 2019, 13 pages.
Final Office Action, U.S. Appl. No. 16/952,009, Dec. 13, 2022, 9 pages.
Final Office Action, U.S. Appl. No. 18/196,980, Mar. 11, 2024, 22 pages.
H. Brendan Mcmahan et al., "Communication-Efficient Learning of Deep Networks from Decentralized Data," 2017, 10 pages, Proceedings of the 20th International Conference on Artificial Intelligence and Statistics (AISTATS), Fort Lauderdale, Florida, USA.
Ian Goodfellow et al., "Deep Learning," 2016, 798 pages, MIT Press.
IT Services, "Environmental impact of IT: desktops, laptops and screens", How we are reducing IT waste, and steps you can take to reduce your carbon footprint, available online at <https://www.it.ox.ac.uk/article/environment-and-it>, Apr. 13, 2022, 5 pages.
Justin Sutton-Parker, "Can analytics software measure end user computing electricity consumption?", Springer, May 5, 2022, 19 pages.
Justin Sutton-Parker, "Determining commuting greenhouse gas emissions abatement achieved by information technology enabled remote working", The 11th International Conference on Sustainable Energy Information Technology (SEIT), Aug. 9-12, 2021, 9 pages.
Justin Sutton-Parker, Determining end user computing device Scope 2 GHG emissions with accurate use phase energy consumption measurement, The 10th International Conference on Sustainable Energy Information Technology (SEIT), Aug. 9-12, 2020, pp. 484-491.
Justin Sutton-Parker, "Quantifying greenhouse gas abatement delivered by alternative computer operating system displacement strategies", The 12th International Conference on Sustainable Energy Information Technology, Aug. 9-11, 2022, pp. 1-10.
Non-Final Office Action, U.S. Appl. No. 12/412,623, Mar. 7, 2011, 10 pages.
Non-Final Office Action, U.S. Appl. No. 13/084,923, Dec. 9, 2013, 13 pages.
Non-Final Office Action, U.S. Appl. No. 13/084,923, Feb. 14, 2013, 8 pages.
Non-Final Office Action, U.S. Appl. No. 13/107,625, Jan. 14, 2014, 9 pages.
Non-Final Office Action, U.S. Appl. No. 13/301,250, Jun. 26, 2013, 11 pages.
Non-Final Office Action, U.S. Appl. No. 14/530,601, Nov. 10, 2016, 8 pages.
Non-Final Office Action, U.S. Appl. No. 14/553,769, Feb. 9, 2017, 16 pages.
Non-Final Office Action, U.S. Appl. No. 14/554,711, Jul. 29, 2016, 23 pages.
Non-Final Office Action, U.S. Appl. No. 14/554,739, Aug. 26, 2016, 30 pages.
Non-Final Office Action, U.S. Appl. No. 15/004,757, Jun. 21, 2017, 23 pages.
Non-Final Office Action, U.S. Appl. No. 15/004,757, Mar. 9, 2018, 57 pages.
Non-Final Office Action, U.S. Appl. No. 15/668,665, Aug. 7, 2019, 11 pages.
Non-Final Office Action, U.S. Appl. No. 16/943,307, Apr. 27, 2022, 7 pages.
Non-Final Office Action, U.S. Appl. No. 16/952,009, Aug. 1, 2022, 8 pages.
Non-Final Office Action, U.S. Appl. No. 17/503,023, Nov. 25, 2022, 7 pages.
Non-Final Office Action, U.S. Appl. No. 17/732,402, May 21, 2024, 20 pages.
Non-Final Office Action, U.S. Appl. No. 17/751,504, Jun. 9, 2023, 31 pages.
Non-Final Office Action, U.S. Appl. No. 17/856,787, Apr. 11, 2024, 21 pages.
Non-Final Office Action, U.S. Appl. No. 18/196,980, Sep. 8, 2023, 17 pages.
Non-Final Office Action, U.S. Appl. No. 18/204,351, Jan. 5, 2024, 8 pages.
Non-Final Office Action, U.S. Appl. No. 18/225,620, Mar. 14, 2024, 14 pages.
Non-Final Office Action, U.S. Appl. No. 18/374,621, Aug. 16, 2024, 9 pages.
Notice of Allowability, U.S. Appl. No. 17/751,504, Dec. 18, 2023, 11 pages.
Notice of Allowance, U.S. Appl. No. 12/412,623, Oct. 5, 2011, 5 pages.
Notice of Allowance, U.S. Appl. No. 13/084,923, Jul. 30, 2014, 7 pages.
Notice of Allowance, U.S. Appl. No. 13/107,625, Apr. 23, 2014, 7 pages.
Notice of Allowance, U.S. Appl. No. 13/107,625, Oct. 22, 2014, 7 pages.
Notice of Allowance, U.S. Appl. No. 13/301,250, Jan. 21, 2014, 10 pages.
Corrected Notice of Allowance, U.S. Appl. No. 18/516,882, Dec. 20, 2024, 5 pages.
Non-Final Office Action, U.S. Appl. No. 18/421,881, Mar. 21, 2025, 15 pages.
Notice of Allowance, U.S. Appl. No. 17/675,998, Jan. 22, 2025, 10 pages.
Notice of Allowance, U.S. Appl. No. 18/516,882, Dec. 18, 2024, 8 pages.
Corrected Notice of Allowability, U.S. Appl. No. 18/225,620, Oct. 15, 2024, 2 pages.
Final Office Action, U.S. Appl. No. 17/732,402, Nov. 6, 2024, 21 pages.

(56) References Cited

OTHER PUBLICATIONS

Final Office Action, U.S. Appl. No. 18/196,980, Dec. 9, 2024, 26 pages.
Non-Final Office Action, U.S. Appl. No. 18/196,980, Sep. 19, 2024, 24 pages.
Notice of Allowance, U.S. Appl. No. 17/856,787, Nov. 18, 2024, 10 pages.
Notice of Allowance, U.S. Appl. No. 18/374,621, Oct. 30, 2024, 7 pages.
Notice of Allowance, U.S. Appl. No. 18/440,922, Oct. 29, 2024, 11 pages.
Supplemental Notice of Allowability, U.S. Appl. No. 18/204,351, Oct. 1, 2024, 2 pages.

\* cited by examiner

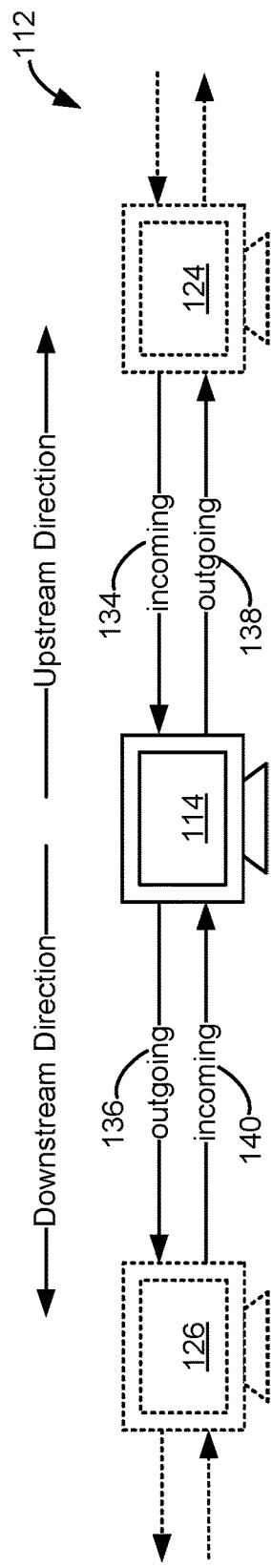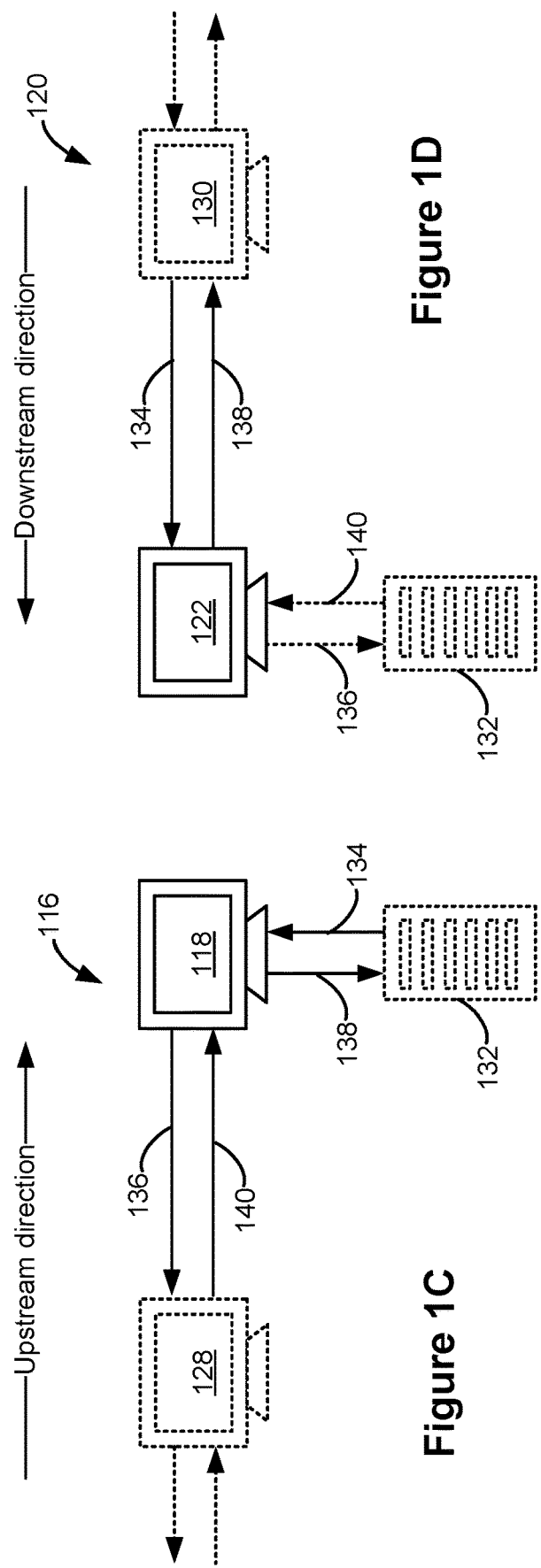
Figure 1B
Figure 1C
Figure 1D

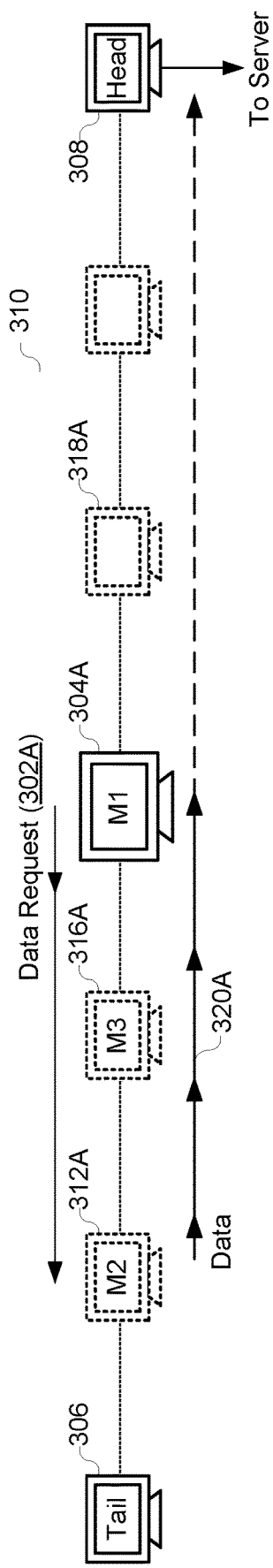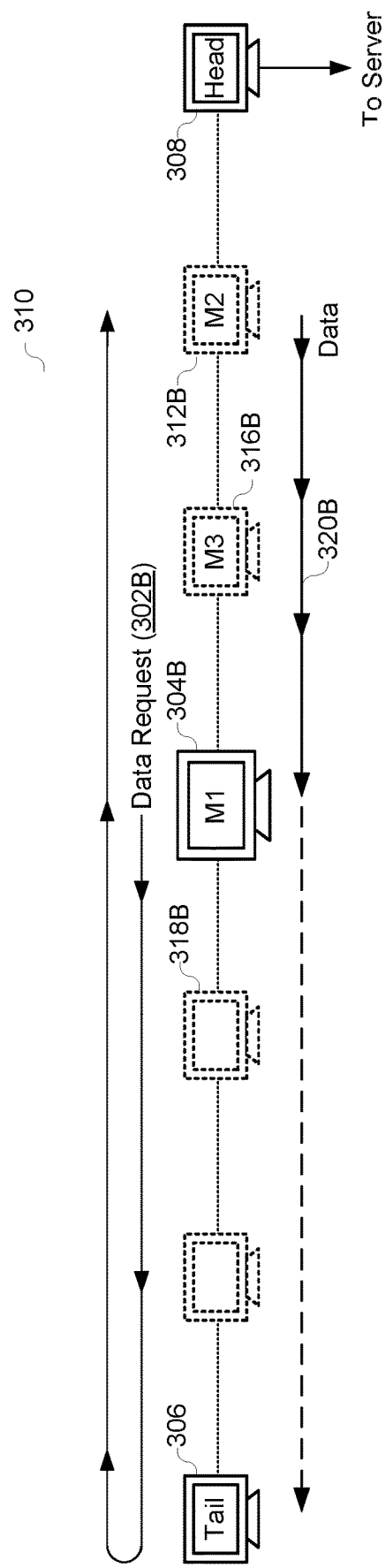
Figure 3A
Figure 3B

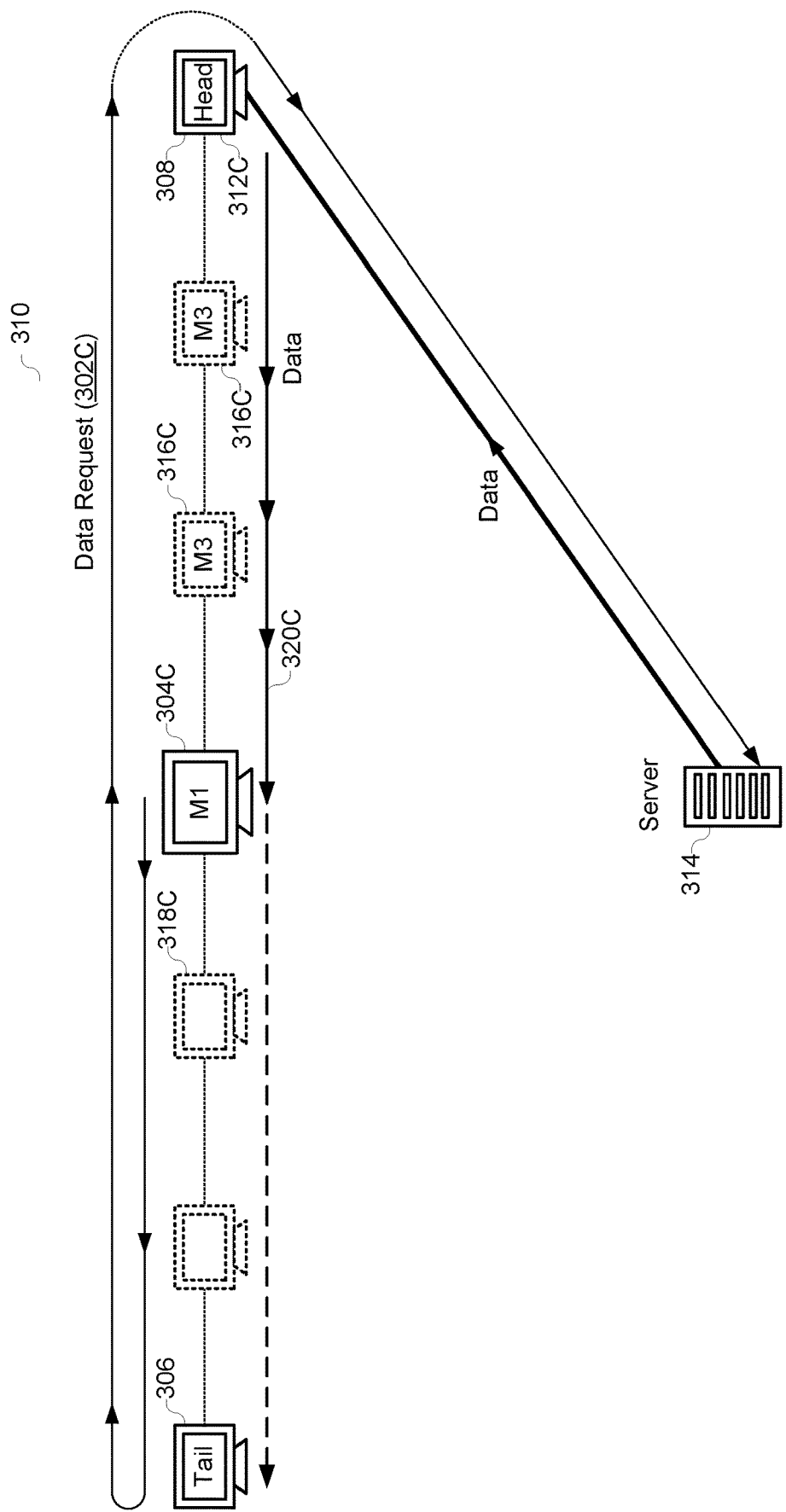

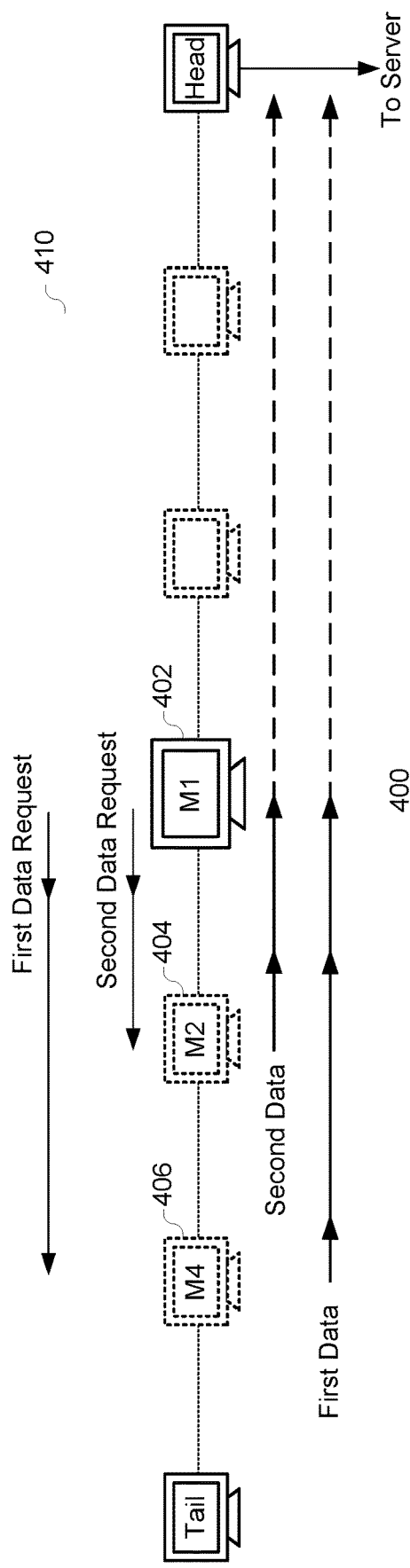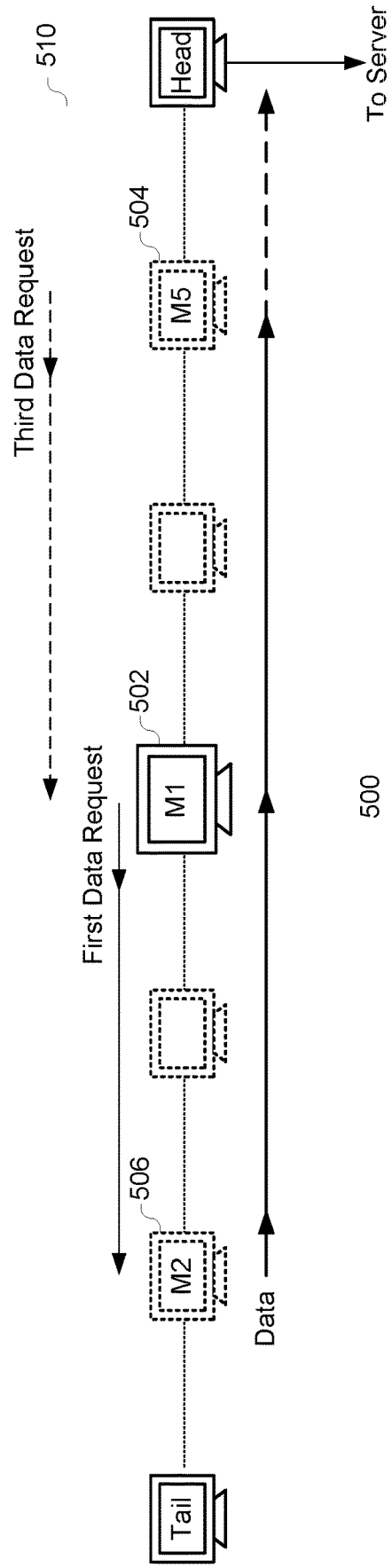
Figure 4
Figure 5A

At a computational machine having a local cache:

1102

Receiving from a first machine a data request that is used to request specific data

1104

The specific data comprises one of a plurality of shards of an object, such as a software application, software application update, software patch, database, or database update

1106

The computational machine and the first machine are interconnected by a single local area network

1108

Determining whether the computational machine stores the specific data in the local cache

At a computational machine having a local cache:

(A)

1110

In accordance with a determination that the computational machine does not store the specific data in the local cache, responding to the data request, by:

1112

Passing the data request to a second machine

1114

When the second machine returns the specific data to the computational machine, returning the specific data to the first machine and determining whether to store the specific data in the local cache according to a data caching method

1116

The data caching method comprises a statistically random method of determining whether to cache respective data received from another machine

1118

The data caching method is based on at least one of the size of the specific data, the size of the local cache, the size of available caches in a linear communication orbit that includes the computational machine, and the size of a respective data set that includes the specific data

1120

In accordance with a determination that the computational machine stores the specific data in its local cache, responding to the data request by returning the specific data to the first machine (B)

Figure 11B

At a computational machine having a local cache:

---1122

The data request comprises a first data request, the method further comprising:

---1124

Receiving at the computational machine, after receiving the first data request, a second data request to request the same specific data as the first data request

---1128

In accordance with a determination that predefined criteria are satisfied, forgoing passing the second data request to the second machine

---1130

In some circumstances, the computational machine is a head node of a linear communication orbit that is organized from a plurality of machines, including the computational machine and the first machine, based on a set of rules at a specific time, and the second machine is a server coupled to the head node.

At a computational machine having a local cache:

---- 1132 ----
In some circumstances, the computational machine is an intermediate machine between neighboring machines within a linear communication orbit, the linear communication orbit being organized from a plurality of machines based on a set of rules at a specific time and subject to changes in configuration and membership when one or more machines join or exit the linear communication orbit.

---- 1134 ----
In some circumstances, the computational machine is downstream of the first machine and upstream of the second machine in the linear communication orbit ---- 1136 ----
Alternatively, the computational machine is downstream of the second machine and upstream of the first machine in the linear communication orbit

Figure 11D

At a plurality of machines that are included in a linear communication orbit, wherein the linear communication orbit terminates at two end nodes, comprising a head node and a tail node:
⎡1202

The plurality of machines that are included in the linear communication orbit are interconnected by a single local area network
⎡1204

The linear communication orbit is organized from the plurality of machines based on a set of rules at a first time and subject to changes in configuration and membership when one or more machines join or exit the linear communication orbit ⎡1206
Generating a data request by a first machine to request specific data
⎡1208

The specific data comprise one of a plurality of shards of an object, such as a software application, software application update, database, or database update

At a plurality of machines:

⓪ A

1210

Passing the data request along a data request path that tracks the linear communication orbit until the request is received at a second machine, in the linear communication orbit, that returns the specific data in response to the data request

1212

> The second machine comprises a machine, in the linear communication orbit, that has a cached copy of the specific data in its local cache or the head node if no machine in the request path has a cached copy of the specific data in its local cache

1214

> The second machine comprises a machine closest, along the data request path, to the first machine that has a cached copy of the specific data in its local cache

1216

> Passing the data request includes passing the data request along the data request path that tracks the linear communication orbit until (A) the request is received at a machine, in the linear communication orbit, that has a cached copy of the specific data in a local cache of the machine or (B) the request is received at the head node, which obtains and returns the specific data in response to the request

At a plurality of machines:

┌─ 1218
At a third machine between the second machine and the first machine in the linear communication orbit conditionally storing the specific data in a local cache of the third machine according to a data caching method ┌─ 1220
The data caching method comprises a statistically random method of determining whether to cache respective data received from another machine ┌─ 1222
The specific data comprises one of a plurality of shards, in an object, to be cached in the linear communication orbit, and the data caching method is based on at least one of the size of the specific data (e.g., the size one particular shard), the size of the object, the size of the local cache of the third machine, and a total size of available caches in the linear communication orbit, and a total size of a data set that includes the object.

Figure 12C

At a plurality of machines:

(F)

1254

The second machine is a downstream machine between the first machine and the tail node, the data request being passed downstream from the first machine to the second machine, the specific data being returned upstream from the second machine to the first machine

1256

The second machine is an upstream machine between the first machine and the head node, the data request being passed from the first machine downstream to the tail node and upstream to the second machine, the specific data being returned downstream from the second machine to the first machine

Figure 12G

SOFTWARE APPLICATION UPDATING IN A LOCAL NETWORK

RELATED APPLICATIONS

This application is a continuation of U.S. application Ser. No. 17/129,638, filed Dec. 21, 2020, which is continuation of U.S. application Ser. No. 16/565,247, filed Sep. 9, 2019, now U.S. Pat. No. 10,873,645, which claims priority to U.S. Provisional Application No. 62/880,610, filed Jul. 30, 2019, and U.S. application Ser. No. 16/565,247 is a continuation-in-part of U.S. application Ser. No. 15/702,617, filed Sep. 12, 2017, now U.S. Pat. No. 10,412,188, which was a continuation of U.S. application Ser. No. 14/554,739, filed Nov. 26, 2014, now U.S. Pat. No. 9,769,275, which claims priority to U.S. Provisional Application No. 61/969,711, filed Mar. 24, 2014, all of which are hereby incorporated by reference in their entireties.

This application is also related to U.S. patent application Ser. No. 14/554,711, filed Nov. 26, 2014, now U.S. Pat. No. 9,667,738, which claimed priority to U.S. Provisional Application No. 61/969,708, filed Mar. 24, 2014, both of which are hereby incorporated by reference in their entireties.

This application is also related to U.S. patent application Ser. No. 13/797,962, filed Mar. 12, 2013, now U.S. Pat. No. 9,059,961, titled "Creation and Maintenance of Self-Organizing Communication Orbits in Distributed Network," U.S. Provisional Application Ser. No. 61/745,236, filed Dec. 21, 2012, titled "System and Network Management Using Self-Organizing Communication Orbits in Distributed Networks," and U.S. Provisional Application Ser. No. 61/774,106, filed Mar. 7, 2013, titled "System, Security and Network Management Using Self-Organizing Communication Orbits in Distributed Networks," the entireties of which are hereby incorporated by reference.

This application is also related to U.S. patent application Ser. No. 12/412,623, filed Mar. 27, 2009, now U.S. Pat. No. 8,086,729, titled "Distributed Statistical Detection of Network Problems and Causes," U.S. patent application Ser. No. 13/084,923, filed Apr. 12, 2011, now U.S. Pat. No. 8,904,039, titled "Large-Scale Network Querying and Reporting", and U.S. patent application Ser. No. 13/107,625, filed May 13, 2011, now U.S. Pat. No. 8,903,973, titled "Parallel Distributed Network Management." Content of each of the above applications is hereby incorporated by reference in its entirety.

BACKGROUND

There are many circumstances in which multiple computational machines (sometimes called computers) on the same local area network (LAN) or wide area network need the same specific data file (e.g., a printer driver, a dll, etc.), the same software application, or the same update to a software application. Data transfers currently make heavy use of both hardware (distributed file servers) and wide area network (WAN) bandwidth, for example, by having each computation machine on the local area network separately obtain a copy of the same application or update from a resource external to the local area network. It would beneficial to have a more efficient data transfer mechanism than the current practice.

It is further noteworthy that in the context of software updates, individual computational machines on the same local area network or wide area network typically need to contact an external server to determine what updates, if any, are required for an application, or for each of several applications, and furthermore need to contact the external server to obtain the required software update files. While such updates are sometimes initiated locally, in the networks of large entities (e.g., corporations, governmental and non-governmental organizations), such updates may be initiated on a shared schedule or in response to a command sent by an administrator to a large number of computation machines via a broadcast message. As a result, hundreds or thousands of computational machines may contact the same external server in a short period of time to obtain the same or overlapping sets of software update metadata and software update files, causing network congestion and inefficient software update processes. It would beneficial to have a more efficient data mechanism for performing concurrent software updates over a large number of computational machines than the current practice.

SUMMARY (A1) In one aspect, a method of data caching and distribution, performed by each respective machine in a plurality of machines that are included in a linear communication orbit (e.g., a linear communication orbit that includes machines at two end nodes, comprising a head node and a tail node, and that is coupled to a server via at least one of the machines at the two end nodes): executing a plurality of software programs, executing a local server distinct from the plurality of software programs, and at the local server, receiving, via the linear communication orbit, update metadata. At an update module executed by the respective machine, the update module (distinct from the local server and the plurality of software programs) receives the update metadata from the local server, evaluates software version information (e.g., the software version information for one more software programs, indicating what updates have already been applied to those programs) using the update metadata to determine a set of one or more updates to be applied to one or more of the plurality of software programs. A patch module sends, via the linear communication orbit, one or more requests so as to request one or more software update files corresponding to the set of one or more updates, and receives the one or more software update files corresponding to the set of one or more updates. Finally, the update module updates the one or more of the software programs by applying the received one or more software update files to the one or more of the software programs.

(A2) In some embodiments, the software version information identifies one or more software applications already installed at the respective machine, and prior updates that have been applied to the one or more software applications.

(A3) In some embodiments, the update metadata includes applicability rules for evaluating the software version information so as to identify updates that have not yet been applied to the one or more software applications. In some embodiments, the update metadata is distributed by a server to all the computational machines on the linear communication orbit meeting one or more filter criteria (e.g., all computational machines running a particular operating system, or all the computation machines running a particular operating system and having a particular software application installed).

(A4) In some embodiments, the update metadata includes applicability rules for evaluating the software version information so as to identify one or more groups of software update files corresponding to updates that have not yet been applied to the one or more software applications.

(A5) In some embodiments of the method of any of A1 to A4, receiving the software update files corresponding to the set of one or more updates includes a set of operations, including: sending, via the linear communication orbit, one or more file manifest requests for file manifests corresponding to the set of one or more updates; receiving, via the linear communication orbit, in response to the one or more file manifest requests, one or more file manifests corresponding to the set of one or more updates; identifying, from the received one or more file manifests, a plurality of individual update files that are not locally stored at the respective machine; sending, via the linear communication orbit, shard requests for each of the individual update files that are not locally stored at the respective machine; receiving, via the linear communication orbit, in response to the shard requests, the requested individual update files; and combining one or more subsets of the individual update files received in response to the shard requests and individual update files, if any, already locally stored at the respective machine, to generate at least one of the software update files corresponding to the set of one or more updates.

(A6) In some embodiments, the set of operations for receiving the software update files corresponding to the set of one or more updates is performed by a patch module distinct from the update module and the local server (A7) In some embodiments of the method of A5 or A6, a respective file manifest of one or more of the file manifests corresponds to two or more of the individual update files, which comprise shards of a respective software update file that when combined, form the respective software update file.

(A8) In some embodiments of the method of A7, prior to the respective machine sending the shard requests, a first plurality of shards of the respective software update file are, in aggregate, locally cached at other machines, other than the respective machine, in the linear communication orbit In such embodiments, the requested individual update files received by the respective machine in response to the shard requests include the first plurality of shards of the respective software update file, received from the other machines in the linear communication orbit that have locally cached one or more of the first plurality of shards of the respective software update file.

(A9) In some embodiments of the method of any of A1 to A8, the linear communication orbit is a linearly arranged sequence of machines configured to sequentially convey messages to each machine in the linearly arranged sequence of machines in the linear communication orbit.

(A9) In another aspect, a system, comprising a respective machine in a plurality of machines that are included in a linear communication orbit (e g., the linear communication orbit includes machines at two end nodes, comprising a head node and a tail node, and is coupled to a server via at least one of the machines at the two end nodes) includes one or more processors, and memory storing one or more programs for execution by the one or more processors, the one or more programs including instructions for performing any of the methods disclosed herein, including the method of any of A1 to A9.

(A10) In another aspect, a computer readable storage medium stores one or more programs for execution by a respective machine of a plurality of machines arranged in a linear communication orbit so as to sequentially convey messages to each of the machines in the linear communication orbit, wherein the linear communication orbit includes machines at two end nodes, comprising a head node and a tail node, and the linear communication orbit is coupled to a server via one of the two end nodes; the one or more programs including instructions for performing any of the methods disclosed herein, including the method of any of A1 to A9.

Other embodiments and advantages may be apparent to those skilled in the art in light of the descriptions and drawings in this specification.

BRIEF DESCRIPTION OF THE DRAWINGS

FIG. 1B-1D illustrate respective local segments of an exemplary linear communication orbit for data caching and distribution in a managed network in accordance with some embodiments.

FIGS. 3A-3C illustrate three respective linear communication orbits that are associated with three scenarios of transferring a data request and distributing specific data based on a location of the specific data in accordance with some embodiments.

FIG. 4 illustrates an exemplary process of providing the data requested by two respective data requests, both generated by a computational machine on a linear communication orbit in accordance with some embodiments.

FIG. 5A illustrates an exemplary process of consolidating data requests issued by two distinct computational machines to request the same specific data on a linear communication orbit in accordance with some embodiments.

FIGS. 11A-11D illustrate a flow diagram representing a method for caching and distribution specific data in accordance with some embodiments.

FIGS. 12A-12G illustrate a flow diagram representing another method for caching and distributing specific data in accordance with some embodiments.

Like reference numerals refer to corresponding parts throughout the drawings.

DESCRIPTION OF EMBODIMENTS

Figure 1A:
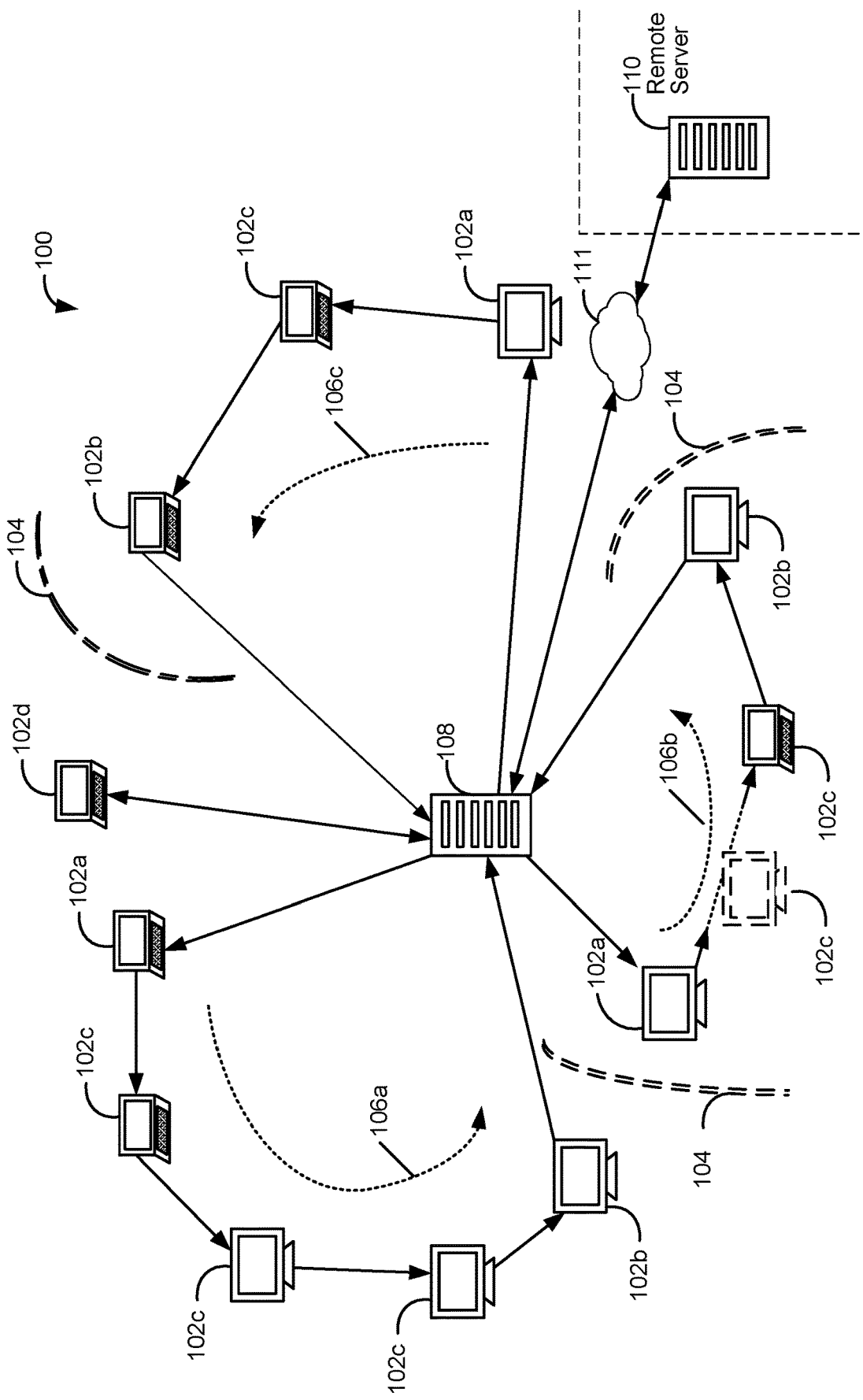
FIG. 1A illustrates a managed network comprising a plurality of interconnected machines, e.g., computers, servers, mobile devices, and other networked devices.

FIG. 1A illustrates a managed network 100 comprising a plurality of interconnected machines 102 (including 102a-d), e.g., computers, servers, mobile devices, and other networked devices. Examples of the managed network 100 include an enterprise network or another network under common management. The managed network 100, sometimes called a distributed set of machines or computers, includes a plurality of sub-networks (e.g., contiguous segments 106), and optionally includes one or more singleton machines (e.g., singleton 102d). Each singleton or sub-network is coupled to a server 108 that facilitates creation, maintenance and operation of the respective singleton and sub-network. This server 108 may be elected automatically from among all or a subset of machines 102 according to various predetermined election rules implemented on machines 102. Each sub-network in the managed network 100 further includes at least two interconnected machines and adopts a certain network topology to organize these machines. Each singleton machine, if any, is a stand-alone node except that it is coupled to server 108. In some embodiments, each singleton or sub-network is further separated from the rest of the managed network 100 by one or more firewalls 104.

Optionally, machines 102 in managed network 100 are distributed across different geographical areas. Alternatively, machines 102 are located at the same physical location. A respective machine 102 communicates with another machine 102 or the server 108 using one or more communication networks. Such communications include communications during normal operations (e.g., user-level operations, such as emailing, Internet browsing, VoIP, database accessing, etc.). The communication network(s) used can be one or more networks having one or more type of topologies, including but not limited to the Internet, intranets, local area networks (LANs), cellular networks, Ethernet, Storage Area Networks (SANs), telephone networks, Bluetooth personal area networks (PAN) and the like. In some embodiments, two or more machines 102 in a sub-network are coupled via a wired connection, while at least some of machines in the same sub-network are coupled via a Bluetooth PAN.

Machines 102 in managed network 100 are organized into one or more contiguous segments 106 (including 106a-c), each of which becomes a sub-network in the managed network 100. In some embodiments, each contiguous segment 106 is a respective linear communication orbit that supports system, security and network management communications within the managed network 100. Furthermore, each contiguous segment 106 includes one head node (e.g., head node 102a), one tail node (e.g., tail node 102b), and a sequence of zero or more intermediate client nodes (e.g., intermediate node(s) 102c) in between the head node and the tail node. In some embodiments, both the head node and tail node of a contiguous segment 106a are coupled to server 108, while the intermediate nodes of the contiguous segment 106a are not coupled to server 108. In some embodiments, only the head node of a contiguous segment 106b is coupled to the server 108, while the intermediate nodes and tail node are not coupled to the server 108.

In some embodiments, server 108 is coupled to a remote a remote server (e.g., remote server 110) that is not part of managed network 100 and is optionally separated from managed network 100 a wide area network 111, such as the internet. For example, server 108 may receive from remote server 110 files or other information that it then distributes to computational machines 102 in managed network 100.

In some embodiments, all machines 102 coupled to a linear communication orbit 106 in network 100 are sorted into an ordered sequence according to a respective unique identifier associated with each machine 102. For example, respective IP addresses of machines 102 are used to sort the machines into an ordered sequence in the linear communication orbit. Each machine is provided with a predetermined set of rules for identifying its own predecessor and/or successor nodes given the unique identifiers of its potential neighbor machines. When a machine joins or leaves the linear communication orbit, it determines its ordinal position relative to one or more other machines in the linear communication orbit according to the unique identifiers and the aforementioned rules. More details on how a linear communication orbit is organized and how each intermediate node, head node or end node enters and leaves the linear communication orbit are provided in the Applicants' prior application, U.S. patent application Ser. No. 13/797,962, filed Mar. 12, 2013, entitled "Creation and Maintenance of Self-Organizing Communication Orbits in Distributed Networks," which is hereby incorporated by reference in its entirety.

Linear communication orbits, such as exemplary linear communication orbits 106a-106c, are established and maintained to facilitate system, security and/or network management operations ascribed to manual and programmed administration of network 100. Examples of system, security and network management operations include: (1) collecting status information (e.g., bandwidth, load, availability, resource inventory, application status, machine type, date of last update, security breach, errors, etc.) from individual machines of the managed network; (2) issuance of system, security and network management commands (e.g., commands related to shutdown, restart, failover, release of resources, change access authorizations, backup, deployment, quarantine, load balancing, etc.) for individual resources and/or machines on the managed network; (3) file distribution, including software installations and updates; (4) detecting presence of particular malicious programs (e.g., viruses, malware, security holes, etc.) on individual machines on the managed network; (5) removal of or disabling particular malicious programs (e.g., viruses, malware, security holes, etc.) on individual machines on the managed network; (6) disabling or suspending suspicious or high-risk operations and activities (e.g., Internet or operating system activities of suspected virus, malware, etc.) on particular machines on the managed network; (7) detecting unmanaged machines coupled to the managed network; (8)

detecting data leakage (e.g., transmission of classified information) from machines on the managed network to locations or machines outside of the managed network; (9) detecting connection or data transfer to/from removable data storage devices (e.g., memory stick, or other removable storage devices) from/to particular ports (e.g., a USB drive) of particular machines on the managed network. Other system, security and network management operations are possible, as will be apparent to those of ordinary skills in the art.

The present specification focuses on data caching and data distribution among the computational machines 102 located at different client nodes of an established linear communication orbit. Such data caching and data distribution operations include, for example, enterprise software installations and updates, software patch installations, anti-virus updates, obtaining a local copy of data file, database updates, etc., within the linear communication orbits 106a-106c.

In some implementations, a system management message is initially issued by the server (e.g., server 108) in the managed network, and includes a command (e.g., a command to obtain and install a specific object, such as a data file or software application, or software update) and a rule. In some embodiments, the system management message is initially received at a head node of an established linear communication orbit, as is then passed along the linear communication orbit to each node in the linear communication orbit until it reaches the tail node of the linear communication orbit. Each node of the linear communication orbit is sometimes called a computational machine; alternatively, each node of the linear communication orbit includes a computational machine.

The rule in the system management message is interpreted by each computational machine in the orbit, which determines whether that machine should execute the command. Alternately stated, the rule, when interpreted by each computational machine in the orbit, determines whether that machine needs a specific object, such as a data file, an application, an update, or the like. If the particular machine 102 determines that it satisfies the rule, and thus needs the object, it generates a plurality of data requests to request a plurality of shards, as described in more detail below. Each of the data requests is a request for respective specific data, herein called a shard. Together the shards form, or can be combined to form, an object, such as a file, an application, or an update.

Each data request propagates along a predetermined data request path that tracks the linear communication orbit until the requested respective specific data are identified at a respective machine that stores a cached copy of the requested respective specific. The respective specific data are thereafter returned, along a data return path, to the computational machine 102 that made the request. Moreover, the requested specific data are selectively cached at the other computational machines located on the path to facilitate potential future installations and updates at other machines on the linear communication orbit. During the entire course of data caching and distribution, each individual computational machine on the linear communication orbit follows a predetermined routine to independently process system management messages, respond to any incoming data request and cache specific data that passes through.

Data distribution in the linear communication orbit(s) 106 shown in FIG. 1A is preferably controlled locally within the linear communication orbit, and many data management functions are distributed to each individual machine. For example, machines located on a data return path independently determine whether to retain a cached copy of data being returned to another machine on the linear communication orbit. Further, each machine located on a data request path independently determines if it has a cached copy of the specific data requested by another machine on the linear communication orbit, and if so, returns the specific data requested from its local cache. The server 108 need not separately manage these functions. Machines located on the data request path determine successively and independently whether each of them retains a cached copy and thereby should return the specific data.

In accordance with many embodiments of the present invention, data caching and distribution is performed using local resources of a linear communication orbit, except when none of the machines on the linear communication orbit have the specific data requested by a machine on the linear communication orbit. Bandwidth on the local area network, which interconnects the machines on the linear communication orbit, is typically very low cost compared with bandwidth on the wide area network that connects a server to one or more machines on the linear communication orbit. In many implementations, the local area network also provides higher data communication rates than the wide area network. Distributed, automatic local caching minimizes or reduces the use of a wide area communication network to retrieve data from a server, particularly when multiple machines on the same linear communication orbit make requests for the same data. As a result, overall performance of a large-scale managed network is improved compared with systems in which each managed machine obtains requested data via requests directed to a server via a wide area network. Due to local caching of content, and locally made caching decisions, far fewer file servers are needed in systems implementing the methods described herein, compared with conventional, large-scale managed networks of computational machines.

FIG. 1B-1D illustrate respective local segments of an exemplary linear communication orbit for data caching and distribution in a managed network in accordance with some embodiments. FIG. 1B illustrates a local segment 112 that is centered about an intermediate client node 114. Intermediate client node 114 is coupled between two immediately adjacent nodes, i.e., predecessor node 124 and successor node 126. Each machine 102 other than a head node and a tail node in a linear communication orbit is such an intermediate node. In some embodiments, an intermediate node is persistently connected only to its predecessor and successor nodes, and not to the server or other nodes in the network.

FIG. 1C illustrates a local segment (e.g., local segment 116) that includes a head node 118 of the linear communication orbit. FIG. 1D illustrates a local segment 120 that includes a tail node 122 of the linear communication orbit in accordance with some embodiments. Head node 118 and tail node 122 are each coupled to an immediately adjacent node, successor node 128 and predecessor node 130, respectively, on the linear communication orbit. In addition, head node 118 is coupled to server 132 that serves as a pseudo-predecessor node for head node 118. In some embodiments, tail node 122 is also coupled to server 132 that serves as a pseudo-successor node for tail node 122; however, in some embodiments, the linear communication orbit terminates at tail node 122. Each node shown in FIGS. 1B-1D is implemented by a respective machine 102 coupled to one of the linear communication orbits (e.g., linear communication orbits 106a-106c) of network 100 in FIG. 1A.

Each machine on the linear communication orbit is coupled to an immediate neighbor machine or a server via a bidirectional communication link that includes a data incoming channel and a data outgoing channel. Intermediate machine 114 has four communication channels (e.g., channels 134-140) that form two bidirectional communication links to couple itself to two respective neighbor machines (e.g., predecessor node 124 and successor node 126). Head node 118 and tail node 122 are similarly coupled to a respective neighbor machine, and in some embodiments to a server, via bidirectional communication links. The bidirectional communication links allow each machine to simultaneously receive information from and provide information to its adjacent machine upstream or downstream in the linear communication orbit. The upstream direction, relative to a machine other than the head node, is the direction of communication or message flow toward the head node. For the head node, the upstream direction is toward the server to which the head node is coupled. The downstream direction, relative to a machine other than the head node, is the direction of communication or message flow toward the tail node. In some embodiments, for the tail node, the downstream direction is undefined. In some other embodiments, for the tail node, the downstream direction is toward the server to which the tail node is coupled.

As shown in FIG. 1B, for intermediate node 114, data incoming channel 134 on an upstream side and data outgoing channel 136 on a downstream side together constitute a part of a forward communication channel that is established to pass information along a downstream direction. Similarly, data incoming channel 140 and data outgoing channel 138 together constitute a part of a backward communication channel along an upstream direction. The forward and backward communication channels further pass other successor and predecessor nodes, and extend downstream and upstream across the entire linear communication orbit. Specific information may be communicated successively from node to node along the forward communication channel, the backward communication channel, or both. In some embodiments, the start of the forward communication channel and the end of the backward communication channel further extends to server 132, because head node 118 is also coupled to serve 132 via a bidirectional communication link.

In various embodiments of the present invention, specific information communicated along the forward or backward communication channel may originate from a server, a head node, a tail node or an intermediate machine (e.g., machine 114 in FIG. 1B) of the linear communication orbit. As it is transferred along the forward or backward communication channel, the specific information may be modified at a certain intermediate machine and continue to be communicated to its immediate neighbor machine on the respective communication channel. In some embodiments, an intermediate machine may determine to retain a copy (e.g., locally cache) of the specific information, independently of whether the information needs to be communicated to the neighboring machine. In addition, in some implementations, each machine in the communication orbit may choose to reverse the direction of communication, when the specific information is received at the respective client node. In some implementations, however, such a reversal of direction occurs only at the tail node.

In accordance with some embodiments of the present invention, specific information that may be communicated in the forward and backward communication channels includes, but is not limited to, system management messages, data requests, specific data (e.g., data requested by the data requests) and status messages. In one example, a system management message is an installation or update message issued by the server, and transferred along the forward communication channel to various client nodes on the linear communication orbit. At a respective client node that receives the installation or update message, the message is parsed into a plurality of data requests each of which may be circulated within the linear communication orbit to request respective specific data. The requested respective specific data are returned to the client node, and distributed to other client nodes along the forward or backward communication channel as well. More details will be presented below concerning specific data caching and distribution processes, such as for installations and updates of applications, databases and the like.

Figure 2A:
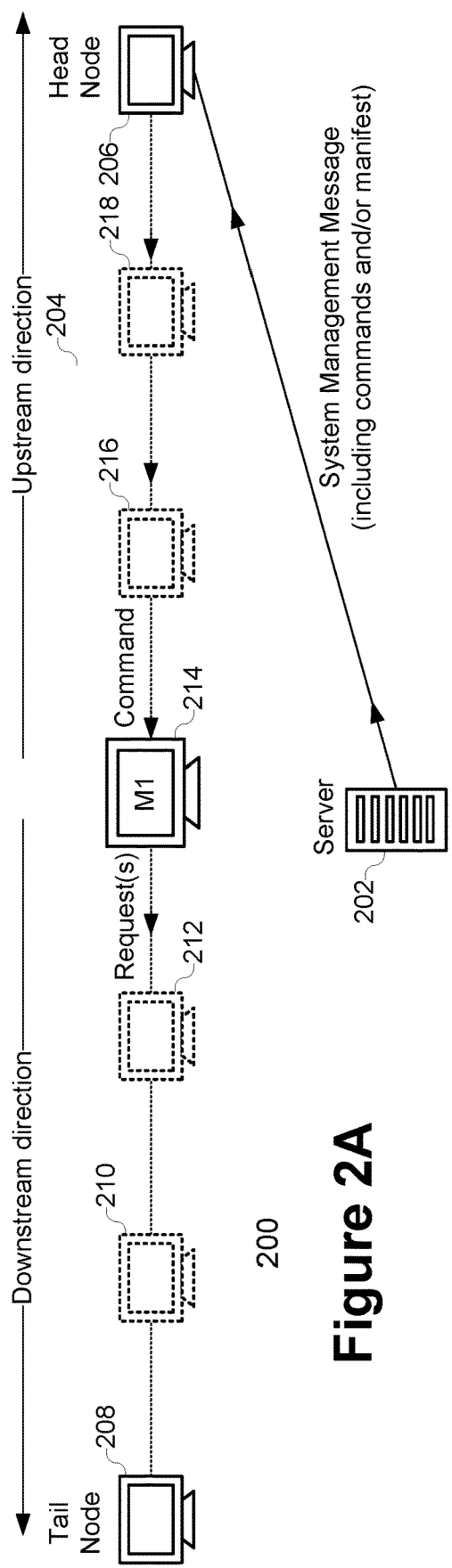
FIG. 2A illustrates an exemplary data caching and distribution system that processes a system management message for file transfers, information installations or updates in accordance with some embodiments.

FIG. 2A illustrates an exemplary data caching and distribution system 200 that processes a system management message for information installations or updates in accordance with some embodiments. The data caching and distribution system 200 includes a server 202 and a linear communication orbit 204 that are coupled at a head node 206. In addition to head node 206, the linear communication orbit 204 further includes a tail node 208 and a plurality of intermediate machines 210-218 which are coupled between head node 206 and tail node 208. While intermediate machines 210-218 illustrate the configuration of linear communication orbit 204, in some embodiments, linear communication orbit 204 includes only one intermediate machine, while in other embodiments, it includes dozen, hundreds or even thousands of intermediate machines.

The system management message is issued by server 202 to request installation or update of the same software application, database, or the like on one or more machines in the linear communication orbit 204. As discussed above, in some implementations, the system management message contains a rule, where the rule is interpreted or evaluated by each computational machine in the linear communication orbit that receives the system management message, and the outcome of that rule interpretation or evaluation by a respective node determines whether node initiates a data transfer to the node, or not. The data transfer, if initiated, typically takes the form of multiple data requests. The system management message may or may not include an explicit data distribution command. For example, in some embodiments, the system management message includes the identifier of a manifest, or includes the manifest itself. In some embodiments, the manifest is a file or list or other object that includes a list of object shards or other units of data. If the manifest contains information for more than one object, the manifest includes, directly or indirectly, a list of object shards or other units of data corresponding to each object. For example, the manifest can include a list of other manifests, each of which identifies object shards or units of data to be combined to form a respective object. In another example, the set of objects identified or referenced by the manifest includes a first set of files (which may include files having executable programs and/or files containing data), and also one or more installation programs for installing the first set of files.

If the evaluation of the rule in the system management message by the computation machine (e.g., destination message 214) indicates that the message is applicable to the computation machine, the computational machine issues a request for the manifest, unless the system management message includes the manifest or the computation machine is otherwise already in possession of a copy of the manifest. When the computation machine receives the manifest, or determines it already has it, the computation machine then undertakes to obtain a copy of each object shard or other unit of data referenced by the manifest, excluding those already in its possession. Typically, the computational machine issues multiple requests for specific data items, and then combines the data items listed in or identified by the manifest so as to complete a data distribution task corresponding to the system management message. In effect, in these embodiments, the system management message is a data distribution command, whether or not the system management message contains an explicit data distribution command.

Stated another way, in accordance with the manifest received by a destination machine, e.g., intermediate machine 214, the destination machine generates a plurality of data requests, each of which is associated with at least one shard of an object to be installed or updated at the destination machine. In one example, each data request is a request of a single respective shard of the object. In some circumstances, one or more shards of the object will have been previously cached in the destination machine and do not need to be requested again. As a result, each destination machine generates a set of data requests to collect only the shards that are absent from its local cache. Upon acquisition of all the shards corresponding to an object, the destination machine combines the shards to generate the entire object.

The system management message is typically delivered to multiple computational machines on linear communication orbit 204, which results in concurrent installations or updates of the same file(s), software application(s), database (s) or the like on multiple computational machines on linear communication orbit 204. The system management message is sent along linear communication orbit 204 to computational machines along linear communication orbit 204. As discussed above, the system management message specifies, directly or indirectly (e.g., through the identification of a manifest, or a manifest embedded in the message) one or more objects to be obtained or generated at one or more computational machines in linear communication orbit 204.

In some embodiments, the system management message originates from server 202 and travels along the forward communication channel that starts from head node 206. At each client node, the respective computational machine determines whether the system management message is applicable to that machine. For example, the computation machine determines whether the message includes a data distribution command that designates the client node, or it evaluates a rule in the message that indicates whether the message is applicable to that computational machine. In accordance with a positive determination, the respective computational machine (e.g., machine 214) retains the corresponding data distribution command, or retains a manifest identified by or embedded in the message. In addition, the system management message continues to be distributed along the forward communication channel to downstream machines for their evaluation. In some embodiments, the intermediate machine 214 generates a command status and reports the command status back to server 202 via the backward communication channel. In some embodiments, when the system management message has been delivered to all the computational machines in the orbit up to tail node 208, it message is deleted by the tail node 208.

In some embodiments, a system management message originates at a respective node on the linear communication orbit, and is distributed to other nodes (i.e., computational machines) along the linear communication orbit starting at the originating node.

Figure 2B:
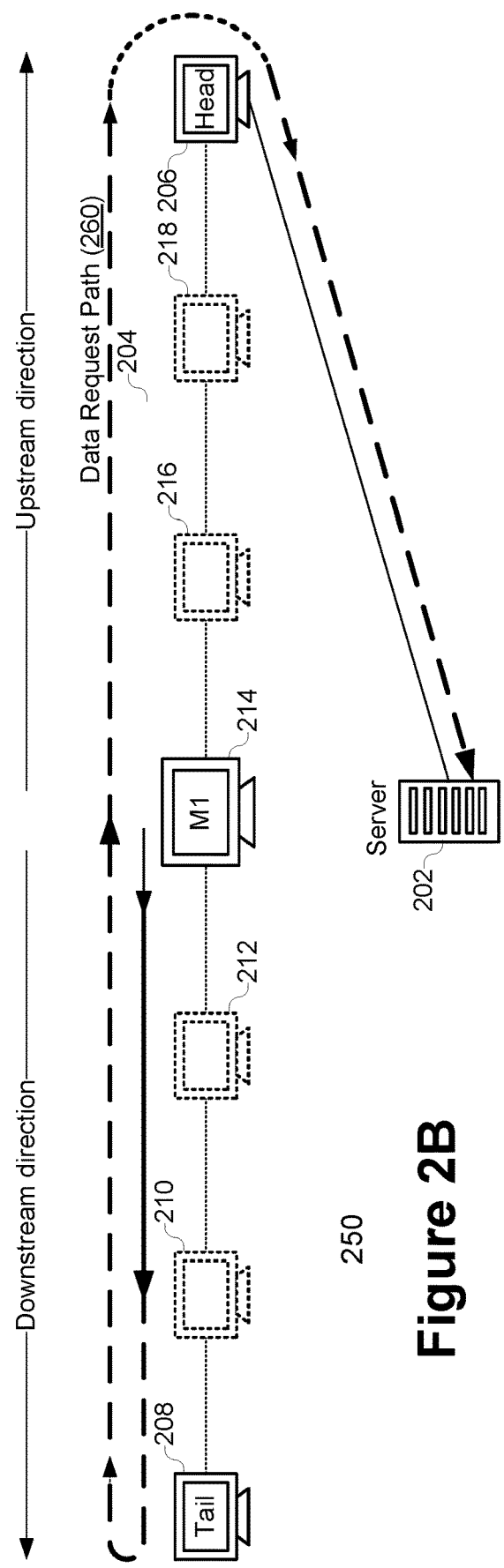
FIG. 2B illustrates an exemplary data caching and distribution system that contains a data request path for propagating a data request and requesting specific data in a linear communication orbit in accordance with some embodiments.

FIG. 2B illustrates an exemplary data caching and distribution system 250 that contains a data request path 260 for propagating a data request and requesting specific data in a linear communication orbit in accordance with some embodiments. At a certain machine (e.g., machine 214), a data distribution command or manifest included in (or identified by) a system management message is parsed into a plurality of data requests according to the manifest. Each of the plurality of data requests is passed along the predetermined data request path 260 that tracks the linear communication orbit 204. In this embodiment, data request path 260 originates from computational machine 214 (i.e., a requester machine), extends along the forward communication channel of the linear communication orbit 204, reaches tail node 208, reverses to follow the backward communication channel, and terminates at head node 206.

In some embodiments, each data request is passed along the data request path 260, until either (A) a cached copy of the specific data (e.g., a shard of a data set) is identified within another computational machine on the data request path 260, or (B) the data request reaches head node 206 because no machine located on the data request path 260 is found to store a cached copy of the specific data in its local cache. In the latter case, head node 206 further passes the data request to server 202 to request a copy of the specific data from the server, and the data request path 260 extends from head node 206 to server 202.

When the requester machine is head node 206, the data request path 260 follows the forward (downstream) and backward (upstream) communication channels, as needed, prior to potentially extending to server 202, if needed. When the requester machine is tail node 208, the data request path tracks the backward (upstream) communication channel and reaches head node 206 if none of the intermediate nodes store a cached copy of the specific data in its local cache.

Once the computational machines along the linear communication orbit 204 have received a system management message that includes a manifest or one or more data distribution commands, server 202 has no further involvement in the distribution and installation of the object(s) specified by the manifest or data distribution commands, other than providing shards to head node 206 when such shards are not found in the local cache of any of the computational machines along linear communication orbit 204. From the perspective of each intermediate machine, the intermediate machine communicates only with its immediate neighbors when responding to a data distribution command in order to obtain the shards corresponding to (or specified by) the data distribution command.

In some embodiments, each intermediate machine on data request path 260 maintains a respective tracking record for each distinct shard that it has requested, or that is requested by a data request received by the intermediate machine. When a data request is received for a shard for which the intermediate node has a tracking record, the local cache of the intermediate machine is not searched for a second time, if the tracking record indicates that the local cache has already been searched for the shard and does not have a copy of the shard. The corresponding data request is directly passed to the next immediate machine on data request path 260 without repeating the search for the shard. Such a tracking record is particularly useful when an intermediate machine has recently searched the local cache for the requested data in response to one data request and then receives another data request that requests the same data again. In some implementations, the tracking record remains valid for a limited duration of time, and is reset or cleared upon receiving a response to the corresponding request.

While FIGS. 2A-2B and other figures presented here show messages and data being communication only along forward and reverse paths of a linear communication orbit 204, with each node sending and receiving messages only from its immediate neighbors, the methods described herein are also applicable to methods where messages are conveyed with the linear communication orbit along other paths. For example, when a node in the linear communication orbit becomes inoperative or unresponsive, messages may be conveyed within the linear communication orbit through an alternative path, so was to skip over or otherwise work around the inoperative or unresponsive node. In such circumstances, the immediate neighbors of a respective node are the nodes before and after it, along a modified data request path within the linear communication orbit.

FIGS. 3A-3C illustrate three respective linear communication orbits 310 that are associated with three scenarios of transferring a data request and distributing specific data based on a location of the specific data in accordance with some embodiments. Each of data requests 302 in FIGS. 3A-3C originates from a requester machine 304, and travels along at least a part of data request path 260 as shown in FIG. 2B. In response to data request 302, the specific data are identified in a data machine 312, and returned to requester machine 304 along a data return path 320 that varies according to the location of data machine 312. In some embodiments, data return path 320 extends from the location of the specific data to one of two end nodes, including tail node 306 and head node 308.

In some embodiments as shown in FIG. 3A, data request 302A is transferred along a part of the forward communication channel on linear communication orbit 310. A cached copy of the specific data is identified in data machine 312A located downstream of requester machine (M1) 304A, and therefore, the data request ceases to be passed to machines on the rest of data request path 260. In this circumstance, the specific data are returned along a data return path 320A that extends between data machine (M2) 312A and head node 308 and overlaps a part of the backward communication channel of linear communication orbit 310.

In some embodiments as shown in FIG. 3B, data request 302B is transferred along both a part of the forward communication channel and a part of the backward communication channel on linear communication orbit 310. A cached copy of the specific data is identified in a data machine (M2) 312B located within linear communication orbit 310 and upstream of requester machine (M1) 304B. As a result, the data request is not passed further upstream beyond data machine (M2) 312B, and the specific data is returned along a data return path 320B that extends between data machine 312B and tail node 306 and overlaps a part of the forward communication channel of linear communication orbit 310.

In some embodiments as shown in FIG. 3C, data request 302C is transferred along entire data request path 260 until it reaches head node 308. In this example, no cached copy of the specific data is identified in any computational machine within linear communication orbit 310. Therefore, head node 308 passes data request 302C to server 314 which provides the requested specific data to head node 308. In this circumstance, once it receives the specific data from server 314, head node 308 is regarded as a data machine 312C within linear communication orbit 310 that has a copy of the requested specific data. The specific data is then returned along a data return path 320C that extends between head machine 308 and tail node 306 and overlaps the entire forward communication channel of linear communication orbit 310.

In some embodiments, data machine 312 includes a machine (within linear communication orbit 310) that is located closest, along the data request path, to requester machine 304 and has a cached copy of the specific data in its local cache.

In some embodiments as shown in FIGS. 3A-3C, requester machine 304 and data machine 312 are separated by at least one intervening machine (M3) 316 on linear communication orbit 310. Independently of the location of data machine (M2) 312, the specific data are successively passed along data return path 320 by the intervening machines coupled between data machine (M2) 312 and requester machine (M1) 304, until they are received by requester machine 304. In addition, each intervening machine determines whether a copy of the specific data is to be cached in its local cache as well. Upon receiving the specific data from its immediate neighbor, requester machine 304 stores a copy of the specific data, and marks the data request as completed.

In some embodiments, after they have been delivered to requester machine 304, the specific data are further passed to additional machines 318 located on data return path 320, until it is received by the corresponding end node, head node 308 or tail node 306, at the end of data return path 320. In some implementations, each additional machine 318 that receives the specific data also determines whether a copy has already been retained locally and, if not, whether such a copy of the specific data is to be locally cached.

In some embodiments, additional machine 318 determines whether a copy has already been retained locally by checking to see if it has a tracking record for a shard, which indicates whether the additional machine's local cache has already been searched for corresponding specific data. If the tracking record is found, the specific data are not present in the local cache. If a tracking record for the shard is not found, additional machine 318 searches its local cache to determine whether a cached copy has already been retained in its local cache.

In some embodiments, a copy of the specific data is created in a local cache of an intervening or additional machine when certain predefined local caching criteria are satisfied. In a broad perspective, the predefined local caching criteria include that no copy of the specific data is already stored in the respective cache as discussed above. In some embodiments, the caching criteria require that certain data not be cached in certain machines due to various reasons (e.g., data security). In some embodiments, the caching criteria set a limit to the number of copies that may be cached in linear communication obit 310, or prohibit the specific data from being cached in two immediately adjacent machines.

When the predefined local caching criteria are met, the copy of the specific data is locally cached according to a data caching method. The data caching method may include a statistically random or pseudorandom method of determining whether to cache respective data received from another machine. In some embodiments, a probability of caching specific data received at any intervening or additional machine is determined in accordance with a parameter, such as the number of machines included in linear communication orbit 310. In one example, the probability of caching has a default value of N/T, where N is an integer corresponding to a target number of copies to be cached within a linear communication orbit, and T is an integer corresponding to the total number of machines in the linear communication orbit. In another example, the probability of caching has a default value of 1/L, where L is an integer (e.g., an integer in the range of 6 to 12). Optionally, the default value for the probability of caching is used when the linear communication orbit 310 has at least a predefined number of machines. However, in some implementations, the probability of caching is reduced to a predefined value, such as ¼, when the number of machines in linear communication orbit 310 is less than another integer M, e.g., 8.

In some embodiments, the probability of caching specific data (e.g., a shard of a file or data set) at any specific machine is determined at the specific machine in accordance with at least one of: a size of the specific data, a total size of a corresponding object or dataset that includes the specific data, a size of the local cache of the specific machine, a size of the unused space in local cache of the specific machine, and a size of all local caches on linear communication orbit 310. In one example, at a machine having a local cache size of 100 Mbytes, the probability to caching a shard of a data set having a total size of 1.0 GBytes is ten percent (10%). In another example, at a machine having a local cache size of X, the probability to caching a shard of a data set having a total size of Y is X/Y (e.g., 10%) so long as the cache has sufficient room to store the shard without evicting from the cache any data that meets predefined non-eviction criteria (e.g., the machine may have predefined non-eviction criteria that prevents eviction of "recently received or used" shards from the same data set as the shard being considered for eviction). In some implementations, the non-eviction criteria are: specific data (sometimes herein called a shard for ease of explanation) is not to be evicted from the cache if either the specific data was first stored in the cache in the last N seconds, where N is a predefined value between 1 and 60, or the specific data was most recently sent to another machine, in response to a data request, in the last M seconds, where M is a predefined value between 1 and 60, where M is not necessarily the same value as N.

In some other embodiments, the cached copies are distributed substantially evenly across linear communication orbit 310. For example, a predefined machine distance is maintained between machines (in the linear communication orbit) selected to store copies of the specific data.

During the course of caching and distributing the specific data, a caching status message may be generated to track copies the specific data in the communication orbit and used to report a caching status back to server 314. In some embodiments, when the specific data are returned to requester machine 304 or cached in a certain intervening or additional machine, the respective machine generates a distinct caching status message and reports it separately to server 314. In some other embodiments, a caching status message traverses the machines of the linear communication orbit, or a subset of the machines of the linear communication orbit, collecting information identifying the machines at which the specific data are locally cached. At the head or tail node, the resulting caching status message is sent to server 314.

In some embodiments, machines in linear communication orbit 310 are included in (and thus interconnected by) a local area network, and communicate with server 314 via head node 308, which is coupled to server 314 through a wide area network. As shown in FIGS. 3A-3C, the machines in the linear communication orbit 310, coupled via the local area network, are searched for specific data. This is called a local search. Only when the local search fails, the corresponding data request is sent to server 314, accessed via the wide area network. Moreover, the specific data are cached and distributed by machines on linear communication orbit 310 during the course of delivering the specific data to a requester machine 304. As a result, extra copies of the specific data are locally cached at additional machines to facilitate data distribution to other machines requesting the same specific data, using only the local area network. When multiple machines on the same linear communication orbit 310 request the same specific data within a short period of time (e.g., a period of less than an hour, or less than 10 minutes), the above data caching and distribution method, on average, substantially reduces data transmitted via the wide area network from server 314 compared with methods in which each machine on the local area network requests data from and receives the requested data from a server via a wide area network.

FIG. 4 illustrates an exemplary process 400 of providing the data requested by two respective data requests, both generated by a computational machine 402 (M1) on a linear communication orbit 410 in accordance with some embodiments. In this example, according to a manifest received from another computational machine in the same linear communication orbit 410 or from a server, computational machine 402 (M1) needs to obtain a plurality of data, including first data and second data, that together constitute an object to be installed or updated on computational machine 402. Therefore, computational machine 402 generates a plurality of data requests, including a first data request and a second data request, for requesting some of the plurality of data from other machines on linear communication orbit 410. Each data request is sent by a computational machine, e.g., requester machine 402, and is transferred along a respective data request path. In response to each data request, the corresponding data are identified in a computational machine on linear communication orbit 410, e.g., machine 404 (M2) or 406 (M4), and returned to requester machine (M1) 402 along a respective data return path. More details on data requests, data caching and data distribution associated with an individual data request are explained above with reference to FIGS. 3A-3C.

In some embodiments, although the two data requests originate from the same requester machine (M1) 402, their corresponding data are identified in different computational machines on linear communication orbit 410. For example, the first data requested by the first data request are identified in computational machine 406 that is located downstream of machine (M2) 404, which stores a copy of the second data requested by the second data request. In this instance, the resulting data return paths for the first and second data originate differently, but both extend along the backward communication channel. In some embodiments, the data return paths terminate at a head node 408 of linear communication orbit 410, thereby giving machines in the linear orbit along the data return paths the opportunity to store a cached copy of the data requested by the first machine (M1). Although they may not entirely overlap, the data return paths for requested data of machine 402 pass requester machine 402. In some alternative embodiments, or in some circumstances, the data return paths terminate at the requesting node 402.

At the end of the data caching and distribution process, requester machine 402 collects the plurality of data that include shards in the object to be installed or updated. Each of the data is either identified in the local cache of machine 402 or returned to machine 402 via the corresponding data return path. Requester machine 402 then combines the plurality of data to generate or reconstitute the object according to the manifest received together with the original system management message or data distribution command.

In many embodiments, multiple machines, including machine 402, on linear communication orbit 410, based on the same manifest, concurrently (i.e., during overlapping time periods) generate requests for the same shards of the same object that needs to be installed or updated on these computational machines. As a result, machines in the linear communication orbit 410 could be flooded with a large number of data requests in a short period of time. Therefore, in some embodiments, at least some of these machines delay generating their respective data requests for shards to avoid generating data requests for the same specific data within a short period of time. This allows local caches of machines on linear communication orbit 410 to be gradually populated with the requested shards.

In some embodiments, at least some of the data requests generated by one requester machine are delayed before they are sent to request shards included in the object from machines on linear communication orbit 410. In some embodiments, this process, sometimes herein called data throttling, is invoked only when (i.e., in accordance with a determination that) a respective machine has generated and/or passed along to neighboring nodes at least a threshold number (e.g., a number between 4 and 20) of unanswered data requests. In some embodiments, different requester machines on linear communication orbit 410 use different length delays between successive data requests generated, or passed along. As a result, data requests generated by different machines are transmitted and processed in a non-concurrent manner in linear communication orbit 410. In some embodiments, the lengths of the delays between successive requests sent by a respective machine vary in accordance with a predefined methodology. In some embodiments, the lengths of the delays between successive requests transmitted by a respective machine fall within a predefined range, such as 0.25 seconds to 5 seconds.

In some embodiments, one or more respective machines on linear communication orbit 410 limit the number of outstanding (i.e., unanswered) data requests (whether generated by the respective machine or passed along) to a predefined number (e.g., a number between 4 and 20). In these embodiments, as requested data arrives at the requested machine, if additional data requests are pending, those data requests are generated or passed along to neighboring machines, subject to the limit on outstanding data requests.

FIG. 5A illustrates an exemplary process 500 of consolidating data requests issued by two distinct computational machines to request the same specific data on a linear communication orbit 510 in accordance with some embodiments. When a server sends a system management message or command that results in an identical object being installed or updated on more than one computational machine on linear communication orbit 510, different computational machines (e.g., machines (M1) 502 and (M5) 504) issue respective data requests to request the same specific data that constitute a shard of the object. In some implementations, the respective data requests are generated in an asynchronous manner, for example in accordance with times introduced according to the data throttling method (sometimes called a spreading method) described above. Consolidation of such data requests helps avoid repetitive data request processing and redundant data caching.

In one example, requester machines (M1) 502 and (M5) 504 that request the same specific data receive a copy of the specific data from the same data machine 506, and share at least a part of their respective data request path. In some embodiments, data machine (M2) 506 is located downstream of both machines (M1) 502 and (M5) 504, while in other embodiments, data machine 506 is located upstream of both machines 502 and 504. However, in some embodiments, data machine (M2) 506 is located between machines (M1) 502 and (M5) 504, in which case machines 502 and 504 have non-overlapping data request paths and each directly obtains the copy of the specific data from data machine 506.

In some implementations, a computational machine consolidates the data requests that separately originate from machines (M1) 502 and (M5) 504, when it determines that predefined criteria in a request consolidation method are satisfied for the data requests. In one example, the computational machine is one of requester machine 502, requester machine 504 or an intermediate machine that is located on an overlapping part of the corresponding data request paths of the data requests. Upon a determination that the criteria in the request consolidation method are met, the computational machine forgoes passing one of the data requests along at least a part of its respective data request path.

In accordance with some exemplary criteria in the request consolidation method, the computational machine determines whether another data request has been previously generated or processed to request the same specific data during a predetermined period of time. The period of time expires when the corresponding specific data are returned, or an expiration time (e.g., a predetermined amount of time after the request is generated or transferred to a next machine along the data request path) is reached.

As shown in FIG. 5A, two computational machines (M1) 502 and (M5) 504 respectively generate a first data request and a third data request to request the same specific data, e.g., a shard of an object. For either machine 502 or machine 504, a respective delay is optionally applied between a first time when a data distribution command or system management message having (or identifying) a manifest is received from the server, and a second time when the corresponding data request is generated. In some circumstances, the first data request is generated at machine 502 after the third data request has been generated by machine 504. Thus, when the first data request is generated at machine 502, the third data request has already been passed by machine 502 to a next machine on the data request path, and machine 502 retains a corresponding tracking record. Thus, when the first data request is generated, machine 502 detects the retained tracking record for the third data request, and based on that information, forgoes sending the first data request to a next machine on the data request path. Machine 502 waits for the corresponding specific data to be returned in response to the third data request, and uses the same specific data to satisfy the first data request.

In certain circumstances, the third data request is generated at machine 504 after the first data request has been generated by machine 502. Machine 502 retains a tracking record corresponding to the first data request when it sends the first data request to a next machine along the data request path. Based on the tracking record for the first data request, the third data request is not passed by machine 502 to a next machine along the data request path.

More generally, each machine that issues or passes a data request retains a tracking record of the request until a response with the request data is received, at which point the tracking record is either removed or marked as no longer pending. If a subsequent request is received after the earlier request has received a response, then the processing of the later data request is not impacted by the earlier request, except that the specific data required to respond to the later request is likely to be locally cached by at least one machine in the linear communication orbit 510.

Figure 5B:
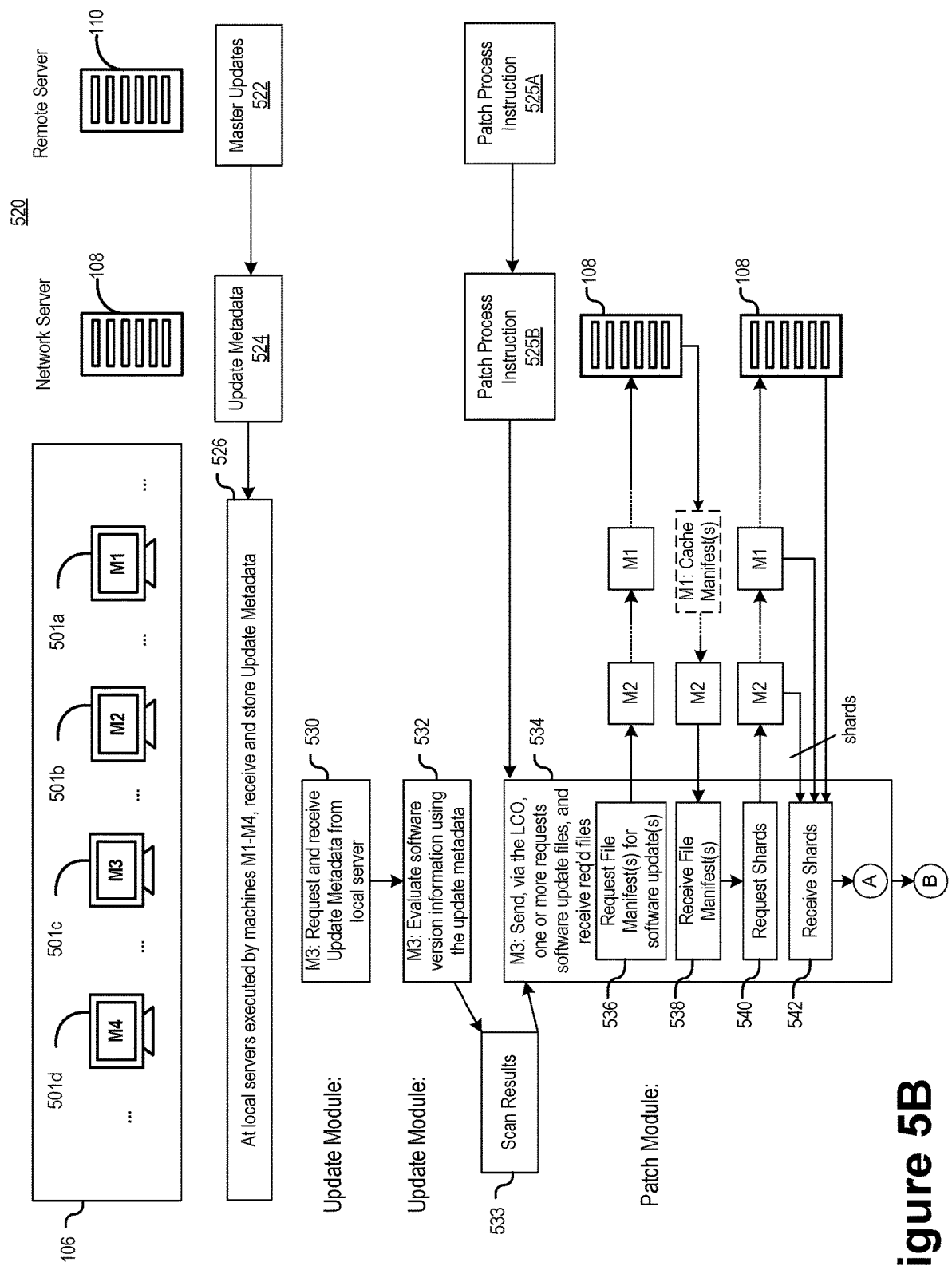
FIGS. 5B-5C illustrate an exemplary process of a respective computational machine, in a linear communication orbit with numerous other computational machines, determining the updates to be applied to one or more software applications at the respective machine, obtaining the corresponding software update files, and updating the one or more software applications using the obtained software update files.
Figure 5C:
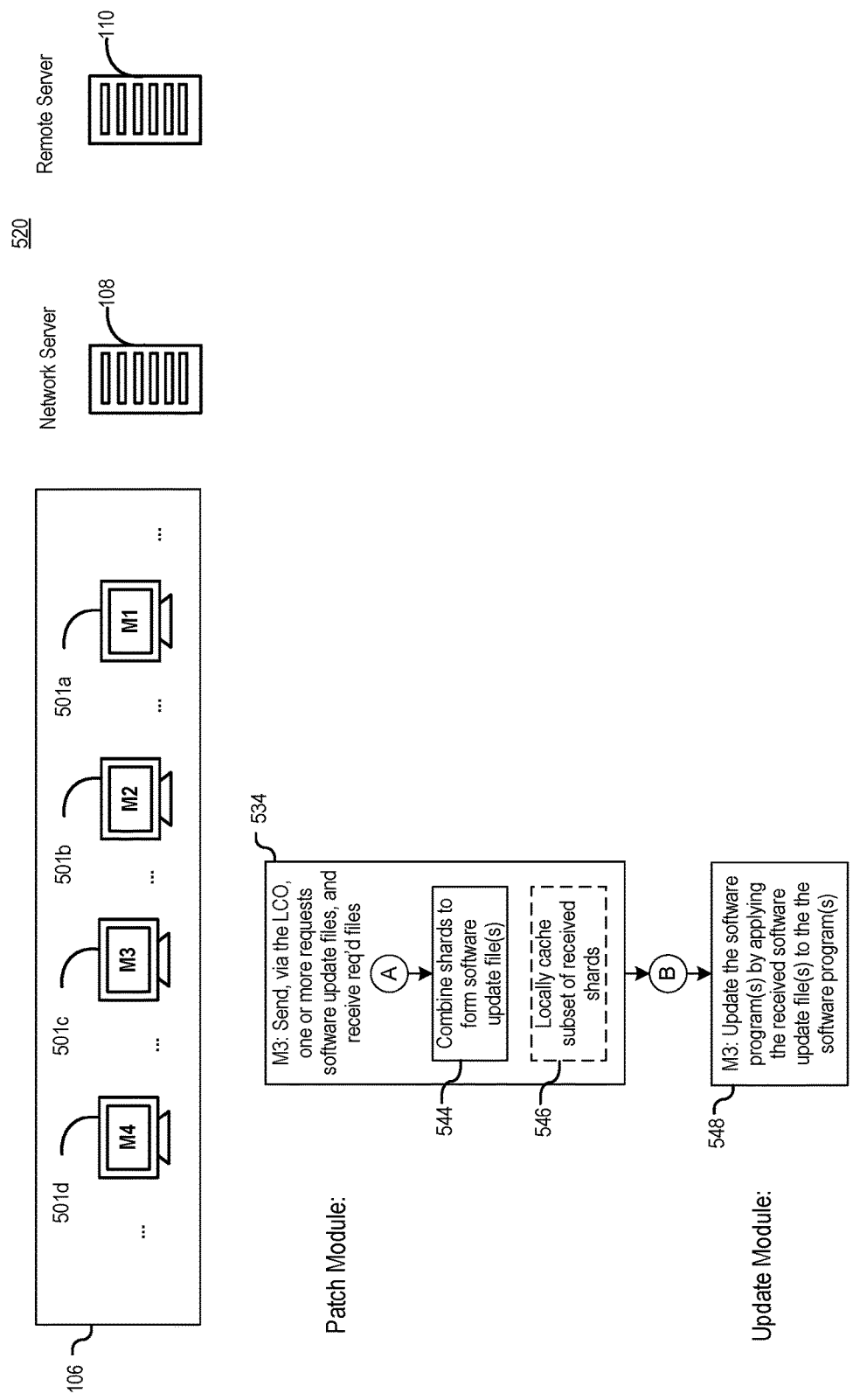

FIGS. 5B-5C illustrate an example of a software update process 520, performed in large part by a respective computational machine, such as machine M3 501c, in a linear communication orbit 106 sometimes called LCO 106, that includes numerous other computational machines (e.g., machines M1 501a (e.g., at a head node of the LCO), M2 501b and M4 501d (e.g., at a tail node of the LCO), of determining the updates to be applied to one or more software applications at the respective machine, obtaining the corresponding software update files, and updating the one or more software applications using the obtained software update files. More particularly, the linear communication orbit 106 includes a linearly arranged sequence of machines configured to sequentially convey messages to each machine 501 in the linearly arranged sequence of machines in the linear communication orbit 106. As indicated by the ellipses in FIGS. 5B-5C, linear communication orbit 106 may include additional machines, optionally located between machines M1 and M2, and/or between machines M2 and M3, machines M3 and M4, and/or before or after M1 or M4 in the linear communication orbit 106. A server 108 is coupled to at least a head node (e.g., corresponding to machine M1 501a, and optionally also to a head node (e.g., corresponding to machine M4 501d) of LCO 106.

As shown in FIG. 5B, a remote server 110, outside the managed network that includes network server 108 and LCO 106, provides "master updates" 522 to network server 108. The master updates 522 include update metadata 524, in some cases update metadata for an entire family of software products. As new updates become available, they are provided by remote server 110 to network server 108. In some embodiments, network server 108 receives update metadata 524 from a plurality of remote servers. For example, each remote server provides to network server 108 update metadata for a different software product or set of software products than the other remote servers. Furthermore, in some embodiments, and typically, remote server 110 provides update metadata to a plurality of network servers, each of which then performs the functions of network server 108 described herein. However, for ease of explanation, the functionality of network server 108 and the software update process performed by computation machines 501 in LCO 106 is described herein with reference to a single network server 108 and remote server 110.

In some embodiments, network server 108, upon receiving update metadata 524 from remote server 110, subdivides and/or organizes the update metadata received from remote server 110 (and optionally the update metadata received from other remote servers as well) into groups of update metadata, for example with separate groups or sets of update metadata for distinct products or categories of products. As a result, network server 108 has smaller, product-specific or category-specific sets of update metadata than the "master update" received from remote server 110, and provides those smaller sets of update metadata to individual computational machines, as described in more detail below.

In some embodiments, network server 108 distributes a particular set of update metadata to computational machines in a respective linear communication orbit 106 by sending the update metadata through the linear communication orbit 106 along with a filter criteria that specify characteristics of the computation machines that should store that particular set of update metadata. For example, the filter criteria may specify a particular operating system, or set of operating systems, as well as a particular software product, so that only computation machines having an operation system and software product that satisfy the filter store the update metadata. In another example, the network server 108 distributes to the computational machines 501 in LCO 106 a file manifest for each distinct set of update metadata. Each computational machine in LCO 106 evaluates a filter in each respective file manifest to determine if it should request the corresponding update metadata, and if the determination by a respective computational machine is positive, the corresponding update metadata is requested by the respective computational machine. As a result, the update metadata is distributed by the network server to all the computational machines on LCO 106 meeting the filter criteria.

As described elsewhere in this document, the distribution of the update metadata to the computational machines (or a subset of such machines) in LCO 106 may be accomplished by distributing a file manifest to the computational machines in LCO 106, after which each computation machine for which the update metadata is potentially relevant (e.g., as determined by the computation machine evaluating filter criteria sent with or included in the file manifest) requests a set of shards corresponding to portions of the update metadata, receives the requested shards in response to those requests, and then combines the shards to reconstruct a local copy of the update metadata.

In some embodiments, update metadata is received and stored (526) by a local server (e.g., local server 642, FIG. 6A) at each computational machine 501 in the LCO 106. The local server is typically a separate program from the software programs (e.g., software applications 640, FIG. 6A) to be updated, and also separate from the patch module (e.g., patch module 670, FIG. 6A, discussed in more detail below) the update module (e.g., update module 660, FIG. 6A, sometimes called an update agent) that determines which updates to apply to respective software programs, and that updates the respective software programs by applying received software updates to those programs. In some embodiments, the local server runs in a separate process from the processes that run the software programs to be updated, and also separate from the processes that runs the update module and the patch module.

While the remainder of the software update process is explained with respect to operations performed by computational machine M3, it should understood that, typically, multiple computation machines in the same LCO 106 will perform the same software update process. One result of this is that shards of the software updates are cached at various computational machines in the LCO 106, and as a result, those shards of the software updates are obtained by computation machine M3 from other computational machines in LCO 106 without having to download them from network server 108, remote server 110, or other remote server.

After the local server of computational machine M3 receives update metadata, the update module of computational machine M3 initiates or otherwise starts an update operation. In some embodiments, or in some circumstances, the update operation is initiated by a command or message received from a network administrator (e.g., using an administrator's machine not shown in FIG. 5B) via the network server 108 and LCO 106. In some embodiments, or in some circumstances, the update operation is initiated by the update module at scheduled times (e.g., once per week at a particular time).

As shown in FIGS. 5B-5C (see "update module" and "patch module" labels at left margins of FIGS. 5B-5C), in some embodiments, some operations (e.g., 530-532 and 548) of the software update process performed by computational machine M3 are performed by an update module (e.g., update module 660, FIG. 6A), while other operations (e.g., 534-546) are performed by a patch module (e.g., patch module 670, FIG. 6A), separate from the update module. For example, in some embodiments, the update module is a third party program, or a set of third party programs, that determine what software updates are needed, and once the corresponding software update files (e.g., software update files 654) have been obtained, apply the determined software updates to their respective programs. On the other hand, in such embodiments, the patch module handles the process of obtaining the software update files, using the data distribution process described elsewhere in this document. However, in some other embodiments, the operations 530-548 shown in FIGS. 5B-5C are performed by a single module, or are differently distributed over two or more modules of computational machine M3.

In some embodiments, after the update metadata has been the received 526, the update operation begins with the update module (of computational machine M3) receiving (530) from the local server (also at computational machine M3) update metadata, e.g., update metadata for a particular software product. In some embodiments, the update module receives (530) the update metadata by sending the local server an update metadata request that includes (A) information identifying a particular software product, and/or (B) information identifying one or more updates already applied to the particular software product. Further, the update module requests and receives from the local server update metadata applicable to the particular software product or update metadata applicable to the particular software product which has been updated with at least the one or more updates identified by the update module. The local server retrieves the requested update metadata by extracting it from the update metadata previously received by the computational machine in operation 526, and provides the extracted update metadata to the update module.

In some embodiments, the update module of computational machine M3 retains, and maintains, software version information (e.g., software version information 664, FIG. 6A) for one or more software products. In some embodiments, the software version information identifies one or more software applications already installed at the respective machine, and prior updates that have been applied to the one or more software applications. In some embodiments, a portion of the software version information is used by the update module to obtain (e.g., as part of the update metadata receiving operation 530, described above) from the local server update metadata applicable to a particular software product or a particular version of the particular software product.

After receiving (530) update metadata from the local server, the update module of respective computation machine (e.g., machine M3) evaluates (532) the software version information (e.g., version information for one or more software programs) using the update metadata (i.e., the update metadata received from the local server) to determine a set of one or more updates to be applied to one or more of the plurality of software programs. In some embodiments, the update data metadata includes applicability rules for evaluating the software version information so as to identify updates (or, more specifically, one or more groups of software update files corresponding to updates) that have not yet been applied to the one or more software applications, and the update module evaluates the software version information using those applicability rules to identify updates to be applied to one or more software programs at the respective computational machine. Of course, in some cases, the evaluation of the software version information using the update metadata will result in a determination that there are no updates that need to be applied to software programs at the respective computation machine, but evaluation process 532 is herein described with respect to those situations in which at least one such update is identified. In some embodiments, operations 530 and 532 are repeated multiple times in order to make a full evaluation of what software updates are needed. In some embodiments, the results of the evaluation are locally stored as "scan results" 533 (corresponding to scan results 666, FIG. 6A), which indicate the software update files needed to update one or more software programs. The scan results 533 are passed to, or accessed by, the patch module, which then performs operation 534 to obtain copies of the software update files needed to update one or more software programs, in accordance with the scan results 533.

After the update module identifies one or more updates to be applied to one or more software programs at the respective computational machine (e.g., computational machine M3), the computational machine (e.g., under control of the patch module) sends (534), via linear communication orbit 106, one or more requests so as to request one or more software update files corresponding to the set of one or more updates, and receives the requested one or more software update files. In some embodiments, the patch module performs operation 534 in response to a patch process instruction 525 (e.g., 525A and/or 525B) sent to computational machine M3 by the remote server 110 or network server 108.

After requesting and receiving (534) the one or more software update files, the update module of the respective computational machine (e.g., computation machine M3) updates (548) one or more software programs by applying the received one or more software update files to the one or more of the software programs.

In some embodiments, the update process (operations 530 to 548) described above is repeated by computational machine M3, and optionally by multiple computation machines in LCO 106, for each of a plurality of distinct software products.

As indicated by FIG. 5B, requesting (534) one or more software update files and receiving the requested one or more software update files typically involves multiple operations, because the software update files tend to be large, and therefore a respective software update file is distributed to respective computational machines in LCO 106 in the form of multiple shards, each of which is smaller than the respective software update file.

As described in more detail below, these operations (536-544) include the computational machine requesting (536) and receiving (538) one or more file manifests, each file manifest corresponding to one or more of the software update files, then requesting (540) and receiving (542) shards identified by each of the file manifests, and then combining (544) the received shards corresponding to each software update file to form (e.g., reconstruct) the software update file. The local caching and forwarding capabilities of the computational machines in LCO 106, described elsewhere in this document, facilitate fast and efficient retrieval of the file manifest and/or shards, thereby significantly reducing the number of file requests received and processed by network server 108.

More specifically, as shown in FIGS. 5B-5C, in some embodiments, requesting (534) one or more software update files and receiving the requested one or more software update files includes sending (536), via the linear communication orbit, one or more file manifest requests for file manifests corresponding to the set of one or more updates.

As shown in FIG. 5B, a respective request for a file manifest is transmitted from machine to machine along a request path of LCO 106, until the request is received by a computational machine (e.g., computational machine M1) with a locally cached copy of the requested file manifest, and if none of the computational machines in LCO 106 have a locally cached copy of the requested file manifest, until the request is received at network server 108.

The respective computational machine receives (538) (e.g., under control of its update module), via the linear communication orbit 106, in response to the one or more file manifest requests, one or more file manifests corresponding to the set of one or more updates. For example, the requested file manifest is returned to the requesting computational machine (e.g., computational machine M3) by either a computational machine (e.g., computational machine M1) in LCO 106 that has a locally cached copy of the requested file manifest or network server 108. In some embodiments, network server 108 maintains file manifests (e.g., file manifests 658, FIG. 6B) for all the software updates that it can distribute to computational machines.

In some embodiments, and typically, a respective file manifest of the one or more of the file manifests corresponds to (e.g., contains information identifying) two or more of the individual update files, which comprise shards of a respective software update file that when combined, form the respective software update file.

After the one or more file manifests have been received, the respective computational machine (e.g., under control of its update module) identifies from the received one or more file manifests, a plurality of individual update files, sometimes herein called shards, that are not locally stored at the respective computational machine. If some of the individual update files are already locally cached at the respective computational machine, there is no need send requests for those individual update files. The respective computational machine (e.g., under control of its update module) sends (540), via the linear communication orbit 106, shard requests for each of the individual update files that are not locally stored at the respective machine. As shown in FIG. 5B, a respective request for a shard is transmitted from machine to machine along a request path of LCO 106 until the request is received by a computational machine (e.g., computational machine M2 or M1) with a locally cached copy of the requested shard, and if none of the computational machines in LCO 106 have a locally cached copy of the requested shard, until the request is received at network server 108.

Next, the respective computational machine (e.g., under control of its update module) receives (542), via the linear communication orbit 106, in response to the shard requests, the requested individual update files. For example, a requested shard (or individual update file) is returned to the requesting computational machine (e.g., computational machine M3) by either a computational machine (e.g., computational machine M2 or M1) in LCO 106 have a locally cached copy of the requested shard (or individual update file) or network server 108. In some embodiments, network server 108 maintains shards (e.g., individual update files (shards) 656, FIG. 6B) for all the software updates that it can distribute to computational machines.

In some embodiments, prior to the respective machine sending the shard requests, a first plurality of shards of a respective software update file are, in aggregate, locally cached at other machines, other than the respective machine, in the linear communication orbit 106. In such embodiments, the requested individual update files received by the respective machine in response to the shard requests include the first plurality of shards of the respective software update file, received from the other machines in the linear communication orbit that have locally cached one or more of the first plurality of shards of the respective software update file.

Finally, after receiving the requested shard, the respective computational machine (e.g., under control of its update module) combines (544) one or more subsets of the individual update files received in response to the shard requests, as well as individual update files, if any, already locally stored at the respective machine, to generate at least one of the software update files corresponding to the set of one or more updates.

It is noted that the respective computational machine optionally also locally caches (546) some of the requested shards, or shards requested by other computational machines in LCO 106, using the locally caching techniques described elsewhere in this document, thereby providing a local repository for at least some of the shards that may be requested by other computational machines in LCO 106 in the future.

Figure 6A:
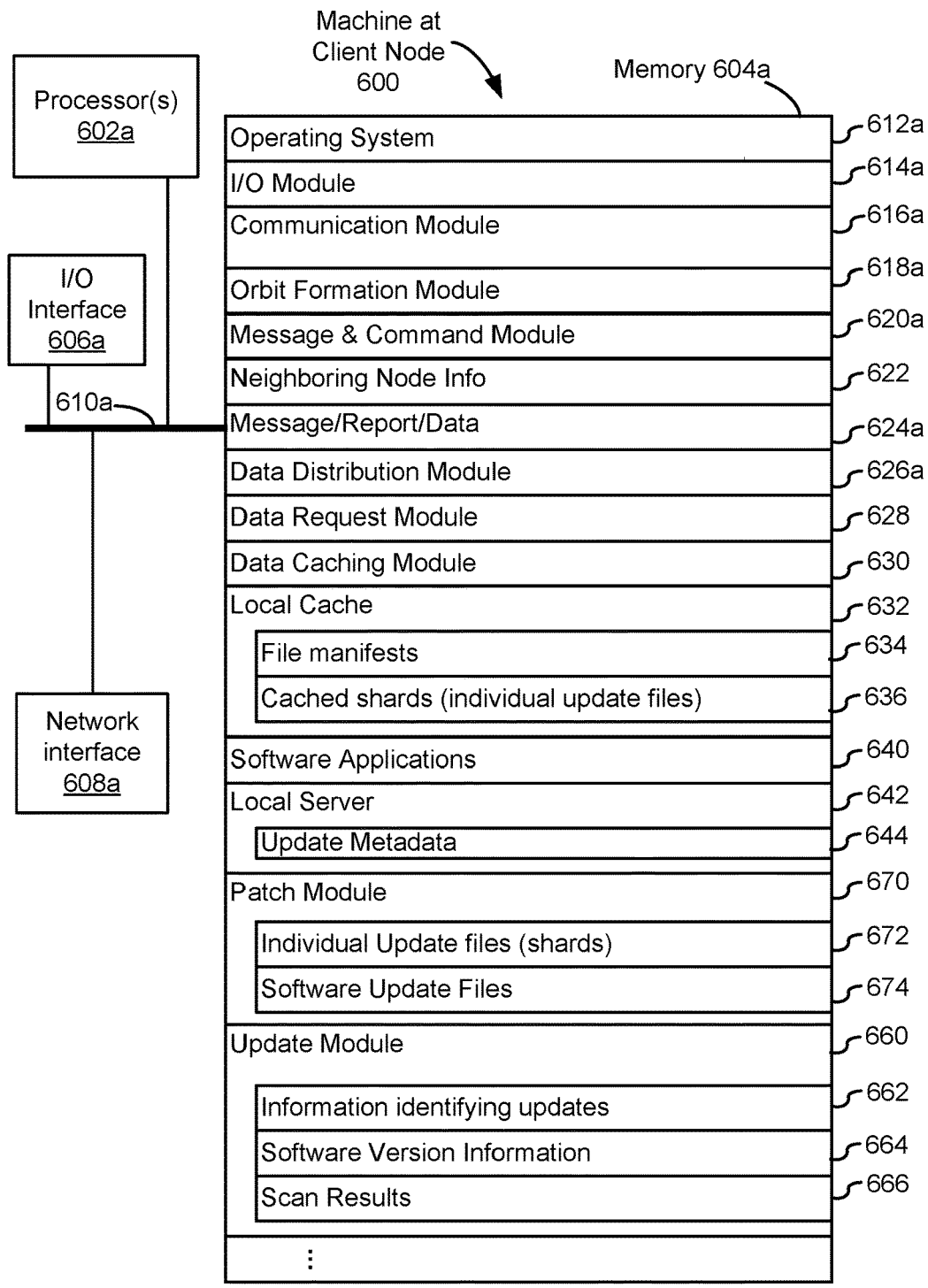
FIG. 6A is a block diagram of an exemplary computational machine in the exemplary linear communication orbits shown in FIGS. 1A-5 in accordance with some embodiments.

FIG. 6A is a block diagram of an exemplary computational machine 600, such as any of the computational machines 102 or 501 in the exemplary linear communication orbits 106 shown in FIGS. 1A-5C, in accordance with some embodiments. In some implementations, machine 600, 102 or 501 includes one or more processors 602a, memory 604a for storing programs and instructions for execution by one or more processors 602a, one or more communications interfaces such as input/output interface 606a and network interface 608a, and one or more communications buses 610a for interconnecting these components.

In some embodiments, input/output interface 606a includes a display and input devices such as a keyboard, a mouse or a track-pad. In some embodiments, communication buses 610a include circuitry (sometimes called a chipset) that interconnects and controls communications between system components. In some embodiments, memory 604a includes high-speed random-access memory, such as DRAM, SRAM, DDR RAM or other random-access solid-state memory devices; and optionally includes non-volatile memory, such as one or more magnetic disk storage devices, optical disk storage devices, flash memory devices, or other non-volatile solid-state storage devices. In some embodiments, memory 604a includes one or more storage devices remotely located from the one or more processors 602a. In some embodiments, memory 604a, or alternatively the non-volatile memory device(s) within memory 604a, includes a non-transitory computer readable storage medium.

In some embodiments, memory 604a or alternatively the non-transitory computer readable storage medium of memory 604a stores the following programs, modules and data structures, instructions, or a subset thereof:

Operating System 612a that includes procedures for handling various basic system services and for performing hardware dependent tasks.

I/O module 614a that includes procedures for handling various basic input and output functions through one or more input and output devices.

Communication module 616a that is used for connecting machine 600 to other machines (e.g., other machines 600 in network 100) or servers (e.g., server 108) via one or more network communication interfaces 608a (wired or wireless) and one or more communication networks, such as the Internet, other wide area networks, local area networks, metropolitan area networks, and so on.

Orbit formation module 618*a* that includes instructions implementing a predetermined set of rules for creating, maintaining, and repairing the linear communication orbit for network and system management.

Message and command module 620*a* that includes instructions for handling receipt, processing, propagation, collecting and reporting of system, security and network management messages and commands.

Neighboring node information 622 that includes information identifying neighboring nodes of machine 600.

Messages, reports and/or other data 624*a* that is stored, temporarily or otherwise, upon receipt from a predecessor node, successor node or server, and/or that is locally generated, revised or supplemented by machine 600 prior to transmission to a predecessor node, successor node or server.

Data distribution module 626*a* that includes instructions for handling receipt, processing, propagation, collecting and reporting in response to system management messages for distributing objects to be installed or updated on machine 600. In some embodiments, the data distribution module 626*a* is included in the message and command module 620*a*. In some embodiments, the data distribution module 626*a* extracts a manifest (or a data distribution command or manifest identifier) from the system management message received from a server, generates a plurality of data requests, identifies or receives respective specific data in response to each data request, and generates or reconstitutes the object from the identified or received specific data according to the manifest.

Data request module 628 that includes instructions for processing data requests received from a predecessor node, successor node or server. The data request module 628 determines whether a copy of specific data is available in machine 600. In accordance with a determination result, the data request module 628 returns the copy to a previous machine or further sends a data request to a subsequent machine on the data request path. In some circumstances, the data request module 628 forgoes sending a data request to successor node or predecessor node, thereby consolidating data requests issued by different machines to request the same specific data.

Data caching module 630 that includes instructions for receiving, caching, and propagating specific data that pass machine 600 and for reporting related caching activities at machine 600. To be specific, the data caching module 630 determines whether specific data shall be cached in a local cache 632 according to a data caching method and caching the specific data in accordance with a positive determination of data caching.

Local cache 632. In some embodiments, local cache 632 includes file manifests 634, received by the respective computation machine 600 during the software update process described above with reference to FIGS. 5B-5C, and cached copies of shards 636 (individual software update files). The file manifests 634 identify individual update files (also called shards) to be requested and, upon receipt, combined to form software update files, as discussed above with reference to FIGS. 5B-5C.

Software applications 640, such as software programs to be updated during the software update process described above with reference to FIGS. 5B-5C.

Local server 642, described above with reference to FIGS. 5B-5C.

Update metadata 644, received by local server 642 and provided to update module 660 during the software update process described above with reference to FIGS. 5B-5C.

Update module 660, the operation of which is described above with reference to FIGS. 5B-5C. In some embodiments, update module 660 receives information 662 identifying updates (e.g., update metadata received from local server 642), and retains software version information 664, e.g., software version information that identifies one or more software applications already installed at the respective machine and prior updates that have been applied to the one or more software applications. Results produced by the update module 660 evaluating the software version information 664 using the information 662 identifying updates are sometimes herein called scan results 666, which are then passed to (or accessed by) the patch module 670.

Patch module 670, the operation of which is described above with reference to FIGS. 5B-5C. In some embodiments, patch module 670 uses the scan results 666 produced by update module 660 to determine what software update files to obtain; receives individual update files 672, also herein called shards, corresponding to one or more software update files, during the software update process described above with reference to FIGS. 5B-5C, and combines (544, FIG. 5C) the received shards corresponding to each software update file to form (e.g., reconstruct) the software update file (674), as described above with reference to FIGS. 5B-5C.

Figure 6B:
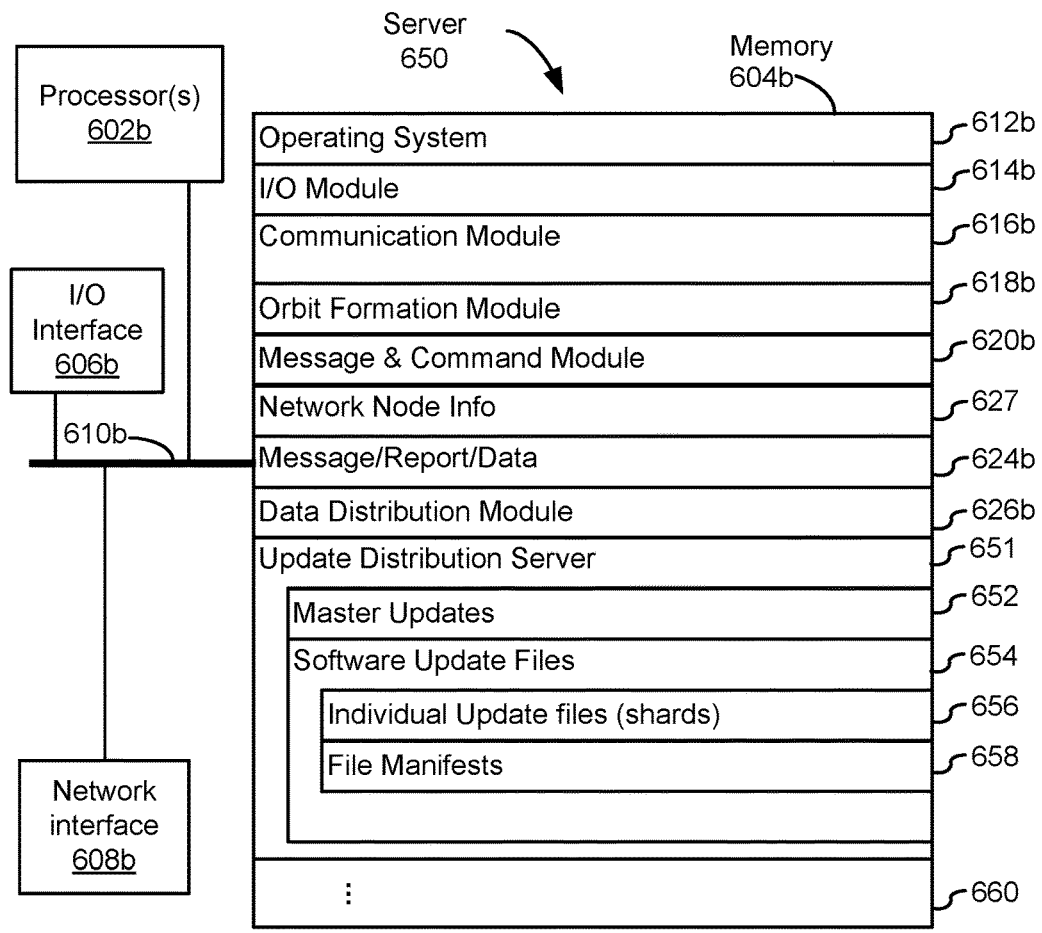
FIG. 6B is a block diagram of an exemplary server in the exemplary linear communication orbits shown in FIGS. 1A-5 in accordance with some embodiments.

FIG. 6B is a block diagram of an exemplary network server 650, such as the network server 108 for the exemplary linear communication orbits 106 shown in FIG. 1A-5C, in accordance with some embodiments. In some implementations, server 650 or 108 includes one or more processors 602*b*, memory 604*b* for storing programs and instructions for execution by the one or more processors 602*b*, one or more communications interfaces such as input/output interface 606*b* and network interface 608*b*, and one or more communications buses 610*b* for interconnecting these components.

In some embodiments, input/output interface 606*b* includes a display and input devices such as a keyboard, a mouse or a track-pad. In some embodiments, communication buses 610*b* include circuitry (sometimes called a chipset) that interconnects and controls communications between system components. In some embodiments, memory 604*b* includes high-speed random-access memory, such as DRAM, SRAM, DDR RAM or other random-access solid-state memory devices; and optionally includes non-volatile memory, such as one or more magnetic disk storage devices, optical disk storage devices, flash memory devices, or other non-volatile solid-state storage devices. In some embodiments, memory 604*b* includes one or more storage devices remotely located from the one or more processors 602*b*. In some embodiments, memory 604*b*, or alternatively the non-volatile memory device(s) within memory 604*b*, includes a non-transitory computer readable storage medium.

In some embodiments, memory 604*b* or alternatively the non-transitory computer readable storage medium of memory 604*b* stores the following programs, modules and data structures, instructions, or a subset thereof:

Operating System 612*b* that includes procedures for handling various basic system services and for performing hardware dependent tasks.

I/O module 614*b* that includes procedures for handling various basic input and output functions through one or more input and output devices.

Communication module 616*b* that is used for connecting server 650 to machines 600 coupled to network 100 via one or more network communication interfaces 608*b* (wired or wireless) and one or more communication networks, such as the Internet, other wide area networks, local area networks, metropolitan area networks, and so on.

Orbit formation module 618*b* that includes instructions to determine which machines 600, of all machines 600 currently known to be coupled to network 100, are coupled to the same local area network, and to communicate information to those machines to enable them to self-organize into a linear communication orbit. In some embodiments, orbit formation module also stores a list of singletons, and head nodes and/or tail nodes of the linear communication orbits in the network.

Message and command module 620*b* that includes instructions for providing and collecting system, security and network management messages. In some embodiments, message and command module 620*b* provides a user interface for a network or system administrator to directly perform various system and network functions, such as issuing status inquiries, providing management instructions, and deploying system configurations.

Network node information 627 that includes information identifying all nodes known to be coupled to network 100. In some embodiments, server 650 maintains a record of nodes currently known to be coupled to the managed network and their respective unique identifiers (e.g., IP addresses and optionally other unique identifiers). Optionally, server 650 also maintains the ordinal positions of these machines in a sorted sequence according to their respective unique identifiers. In some embodiments, network node information includes head, tail and singleton node information, identifying head nodes, tail nodes and singleton nodes with established communication channels to and/or from server 650. In some embodiments, server 650 maintains a list of head nodes, tail nodes, and singleton nodes that have opened forward and backward connections with server 650.

Messages, reports and/or other data 624*b* that is temporarily stored upon receipt from a head node, tail node, or other reporting node.

Data distribution module 626*b* that includes instructions for providing a particular system management message and collecting status messages for distribution and caching of an object. In some embodiments, the data distribution module 626*b* is included in the message and command module 620*b*. Specifically, the data distribution module 626*b* generates a system management message that includes one or more data distribution commands and/or manifests for distributing an object to at least one computational machine on a linear communication orbit. Optionally, the linear communication orbit returns at least one caching status message to server 650, and the data distribution module 626*b* tracks locations on the linear communication orbit of locally cached copies of each shard included in the object. In some embodiments, the message and command module 620*b* also provides a user interface for a network or system administrator to dispatch software installation or update commands, or database installation or update commands, to a selected group of machines.

Update distribution server 651, which may be implemented as a software module executed by server 650 or 108. In some embodiments, update distribution server 651 receives master updates 652, comprising update metadata, from one or more remote servers 110 (e.g., as shown in FIG. 1A). As described above, update distribution server 651 may reorganize or subdivide master updates 652 received from the one or more remote servers into groups of update metadata, for example with separate groups or sets of update metadata for distinct products or categories of products.

Software update files 654. In some embodiments, update distribution server 651 also receives and locally stores software update files 654 from one or more remote servers 110, each of which is used, at respective computational machines 106 or 501, for performing a particular update to a corresponding software program. In some embodiments, to facilitate distribution, and local caching at computational machines in a linear communication orbit 106, each software update file 654 (or, alternatively, each software update file bigger than a predefined size) is implemented as a set of individual update files 656, sometimes called shards, that when combined form the corresponding software update file 654, and a file manifest 658 that includes information identifying the individual update files or shards 656 for that software update file 654.

FIGS. 6A and 6B are merely illustrative of the structures of machines 600 and server 650. A person skilled in the art would recognize that particular embodiments of machines 600 and server 650 may include more or fewer components than those shown. One or more modules may be divided into sub-modules, and/or one or more functions may be provided by different modules than those shown. In some embodiments, an individual one of machines 600 implements or performs one or more methods described herein as being performed by a respective computational machine, including the methods described with respect to FIGS. 11A-11D. In some embodiments, a plurality of machines 600 in a linear communication orbit, such as those shown in FIGS. 1A through 5, together implement or perform one or more methods described herein as being performed by a plurality of computational machines, including the methods described with respect to FIGS. 12A-12G.

Figure 7:
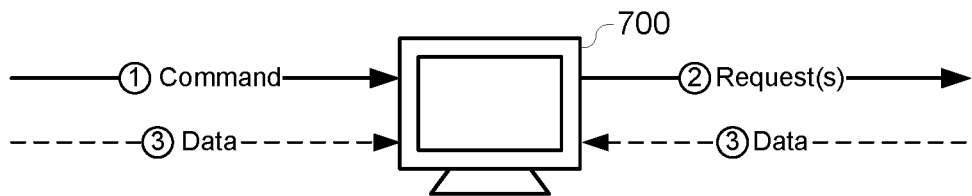
FIG. 7 illustrates an exemplary computational machine that responds to an incoming data distribution command in accordance with some embodiments.

FIG. 7 illustrates an exemplary computational machine 700 that responds to an incoming data distribution command in accordance with some embodiments. In some embodiments, machine 700 receives a system management message from another machine, herein called a first machine, and evaluates the system management message, to determine if the system management message is applicable to machine 700. In these embodiments, the system management message includes the aforementioned data distribution command. If machine 700 determines that the received system management message is applicable to machine 700, machine 700 then executes the aforementioned data distribution command.

For example, when machine 700 is an intermediate machine on a linear communication orbit, the first machine is typically an immediate neighbor machine that is located upstream of machine 700. When machine 700 is a head node on the linear communication orbit, the first machine is a server that is coupled to the linear communication orbit via the head node. In accordance with a manifest in, or specified by, the system management message, the data distribution command is parsed into a plurality of data requests to request shards of an object that needs to be installed or updated on machine 700. Each shard is returned to machine 700 either from the first machine or from a second machine on the linear communication orbit, such as an immediate neighbor machine located downstream of machine 700 on the linear communication orbit.

In some embodiments, other than evaluating the received system management message to determine if the message is applicable to machine 700, and generation of the data requests, machine 700 does not proactively control search, distribution and caching of copies of the shards included in the object; rather, machine 700 passively waits for the requested data to be returned by neighboring machines in the linear communication orbit (e.g., either machine of its two immediate neighbor machines). In some embodiments, when the requested data are not returned within a predetermined wait time, machine 700 sends a status message to a server via the first immediate neighbor machine, and the server provides a copy of the requested data to machine 700 via the first immediate neighbor machine.

Figure 8A:
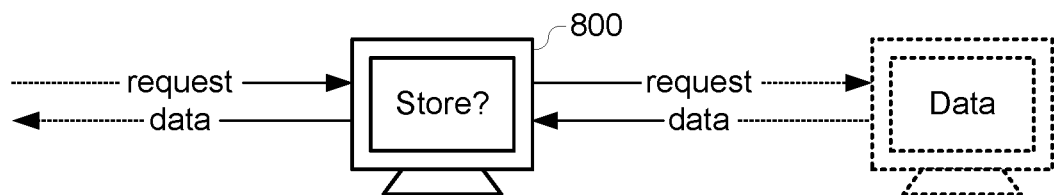
FIG. 8A illustrates an exemplary intermediate machine that processes a data request and conditionally stores specific data requested by the data request in accordance with some embodiments.

FIG. 8A illustrates an exemplary intermediate machine 800 that processes a data request and conditionally stores specific data requested by the data request in accordance with some embodiments. Intermediate machine 800 receives the data request from a first machine, and in various embodiments, the first machine may be located upstream or downstream of machine 800 on a linear communication orbit. The data request is generated by the first machine or another machine that is located further away along the stream. In response to this data request, intermediate machine 800 determines whether the requested specific data are stored in its local cache. In accordance with a determination by intermediate machine 800 that the specific data are stored in its local cache, the specific data are returned by intermediate machine 800 to the first machine, and the data request is not passed to any other machines by intermediate machine 800.

In contrast, when intermediate machine 800 determines that the specific data are not stored in its local cache, the data request is passed by intermediate machine 800 to a second machine that is distinct from the first machine. The second machine or each machine on a corresponding data request path successively repeats the aforementioned determination process, described here for intermediate machine 800, until a copy of the specific data is identified and successively returned to intermediate machine 800. Then, intermediate machine 800 returns the specific data to the first machine, and moreover, determines whether to store the specific data in the local cache of intermediate machine 800 according to a data caching method as explained above.

Figure 8B:
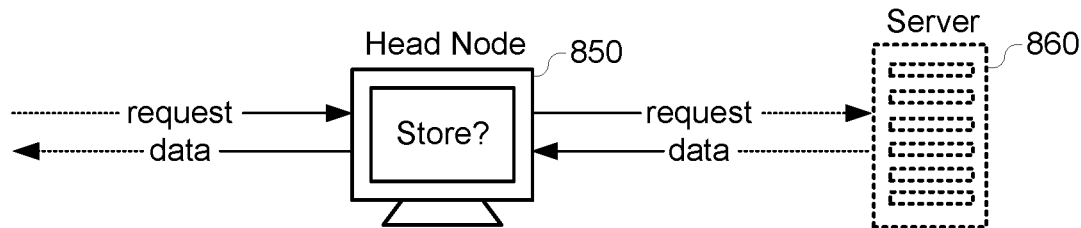
FIG. 8B illustrates an exemplary computational machine that acts as a head node of a linear communication orbit and conditionally stores specific data during the course of processing a corresponding data request in accordance with some embodiments.

In some embodiments, the requested specific data are not identified in machines included in the corresponding linear communication orbit, and have to be requested from a server via a head node. FIG. 8B illustrates an exemplary computational machine 850 that acts as a head node of a linear communication orbit and conditionally stores specific data during the course of processing a corresponding data request in accordance with some embodiments. Head node 850 receives a data request from a first machine that is an immediate neighbor machine included in the linear communication orbit. In some circumstances, head node 850 identifies the requested specific data in its local cache and returns the requested specific data to the first machine. However, in many circumstances, head node 850 does not have the requested specific data, and therefore, passes the data request to a server 860 that is coupled to the linear communication orbit. When server 860 returns a copy of the specific data, head node 850 returns the copy to the first machine, and determines whether to store the specific data in the local cache of head node 850 according to a data caching method as explained above.

In some embodiments, the local cache of any particular machine on a linear communication orbit is a part of the entire memory system of the particular machine. In some implementations, contents in the local cache are evicted according to a respective predetermined eviction policy. In some embodiments, the predetermined eviction policy specifies a predetermined and fixed eviction time, and requires the specific data be deleted from the local cache after the predetermined eviction time passes. However, in some other embodiments, caching activities are monitored for each item (e.g., shard, manifest, file or the like) stored in the local cache. When space is needed in the local cache to store new content, one or more items in the local cache is deleted in accordance with the monitored caching activities (e.g., one or more cached items deemed to be the most stale are deleted from the local cache).

Under many circumstances, each computational machine on the linear communication orbit independently manages the handling of data requests and the handling of specific data received at the computational machine. In particular, upon receiving a data request, each computational machine proactively processes the data request according to a set of predetermined routines and the internal state of the computational machine, without requiring instruction or state information from any other computation machine. Similarly, upon receiving specific data, each computational machine proactively processes the specific data according to a set of predetermined routines and the internal state of the computational machine, without requiring instruction or state information from any other computation machine. As a result, in many situations, the data request and distribution process is self-organized, self-managed and completed locally on the linear communication orbit.

Figure 9:
FIG. 9 illustrates an exemplary computational machine that consolidates two data requests that request the same specific data in accordance with some embodiments.

FIG. 9 illustrates an exemplary computational machine 900 that consolidates two data requests that request the same specific data in accordance with some embodiments. The two data requests include a first data request and a second data request in which the first data request is processed by machine 900 at a time earlier than the second data request. The first data request is either generated at machine 900 or passed from a first machine to a second machine via machine 900. In some embodiments, the first machine and the second machine constitute two immediate neighbor machines of machine 900. In response to the first data request, specific data are returned from the second machine to machine 900.

The second data request is generated at machine 900 or received from either one of the first and second machines. Under some circumstances, the first and second data requests are received from different machines of the first and second machines. In addition, the second data request is generated or received at machine 900 before the requested specific data are returned to machine 900 in response to the first data request.

The first and second data requests are consolidated at machine 900 when predefined criteria in a request consolidation method are satisfied. As a specific example, if no response to the first data request has yet been received by machine 900, machine 900 forgoes passing the second data request to a subsequent machine when that would require machine 900 to pass the second data request to the same subsequent machine as the machine to which it passed the first data request. When the requested specific data are returned to machine 900 in response to the first data request, machine 900 responds to both the first data request and the second data request. If either request was generated by machine 900, that request is "responded to" by retaining the specific data. For example, the specific data may be passed, within machine 900, to an application that will combine the specific data with other data so as to generate an object. As a result, the first and second data requests are consolidated at machine 900. More details on the data request consolidation process are explained from the perspective of requester machines in the above description of FIG. 5A.

Figure 10A:
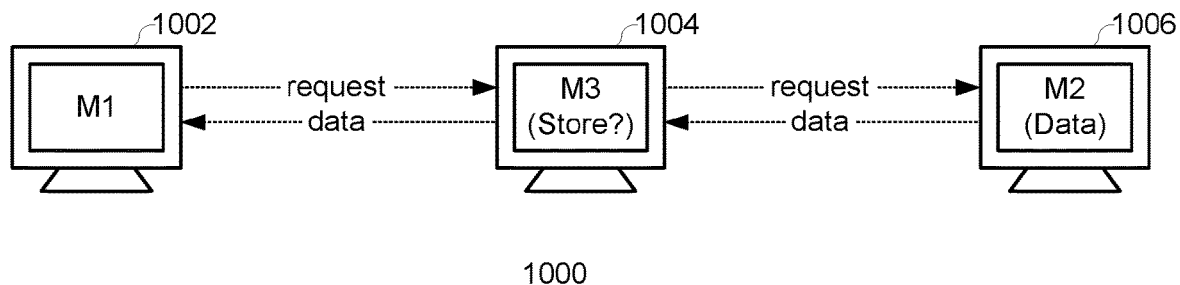
FIG. 10A illustrates a conceptual block diagram of a linear communication orbit that distributes and caches specific data in accordance with some embodiments.

FIG. 10A illustrates a conceptual block diagram of a linear communication orbit 1000 that distributes and caches specific data in accordance with some embodiments. Linear communication orbit 1000 includes a requester machine 1002, an intermediate machine 1004 and a data machine 1006. Requester machine 1002 generates a data request that requests specific data, and the specific data are subsequently identified in data machine 1006. As the specific data are returned to requester machine 1002 from data machine 1006, they pass intermediate machine 1004 and are conditionally stored within a local cache of intermediate machine 1004 based on a data caching method.

Linear communication orbit 1000 terminates at two end nodes, including a tail node and a head node that is coupled to a server. In some embodiments, requester machine 1002, data machine 1006 or both of them are the end node(s) of linear communication orbit 1000.

In some embodiments, a data request is passed along a forward communication channel from requester machine 1002 to data machine 1006, in a downstream direction on linear communication orbit 1000, and the specific data are returned upstream from data machine 1006 to requester machine 1002. However, in some circumstances (e.g., when none of the machines downstream of machine 1004 have a locally cached copy of the data requested by a data request, the data request is passed downstream from requester machine 1002 to a tail node, and returned upstream to data machine 1006. In response to the data request, the specific data are returned downstream from data machine 1006 to requester machine 1002.

When intermediate machine 1004 receives the specific data requested by a data request, it independently determines whether to cache the specific data according the data caching method as explained above, without regard to the locations of requester machine 1002 and data machine 1006.

Figure 10B:
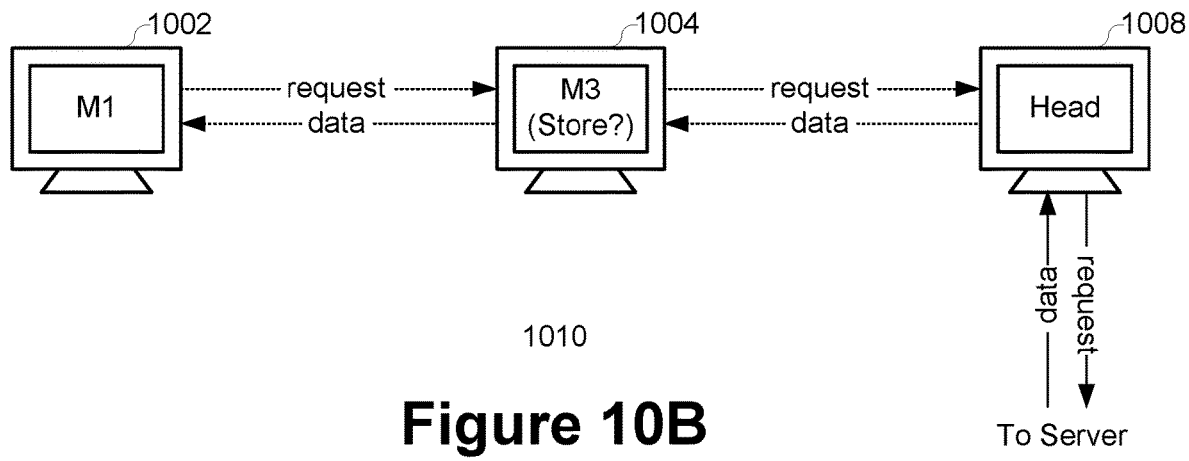
FIG. 10B illustrates a conceptual block diagram of another linear communication orbit that distributes and caches specific data in accordance with some embodiments.
Figure 12D:
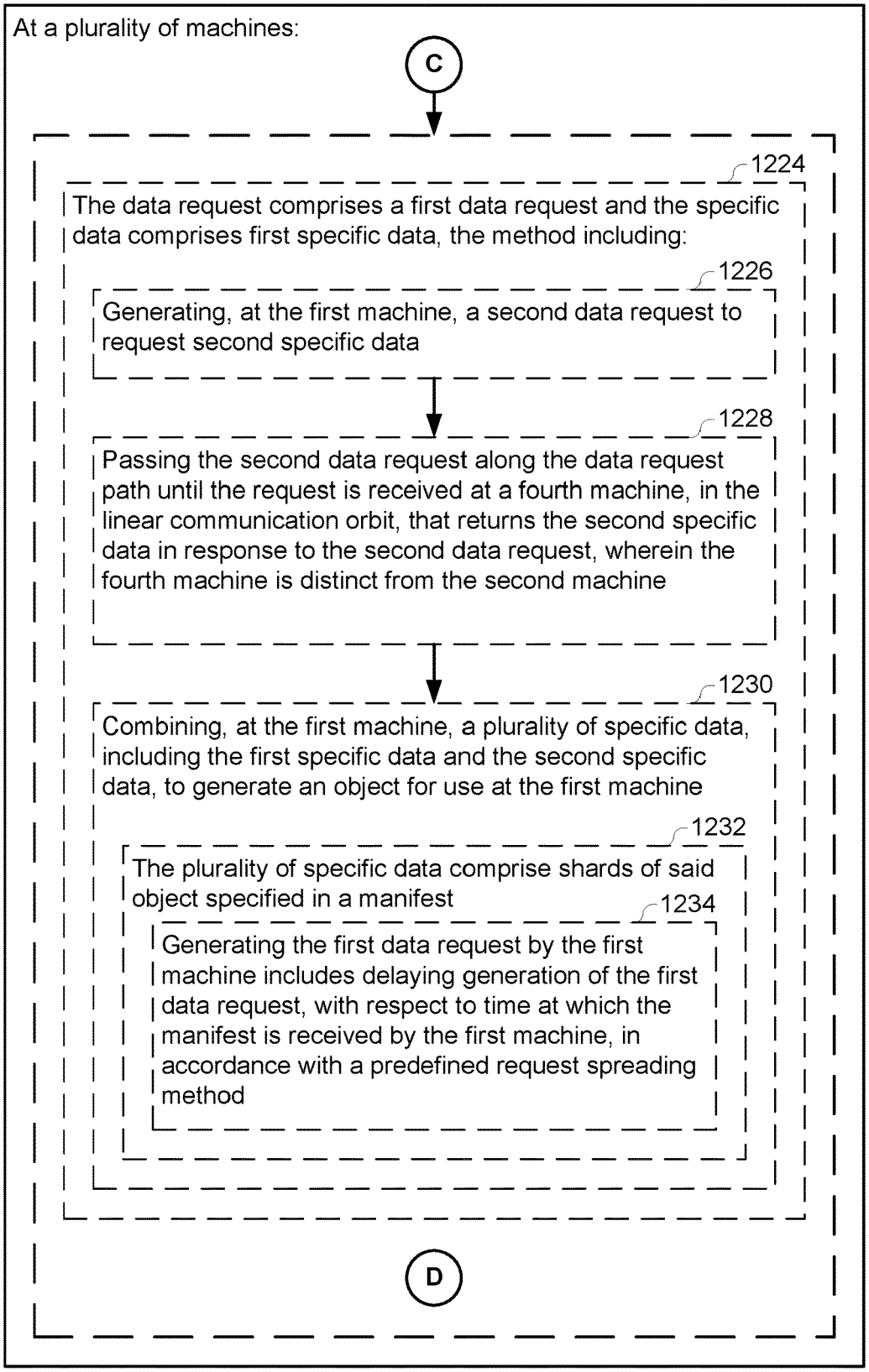
Figure 12E:
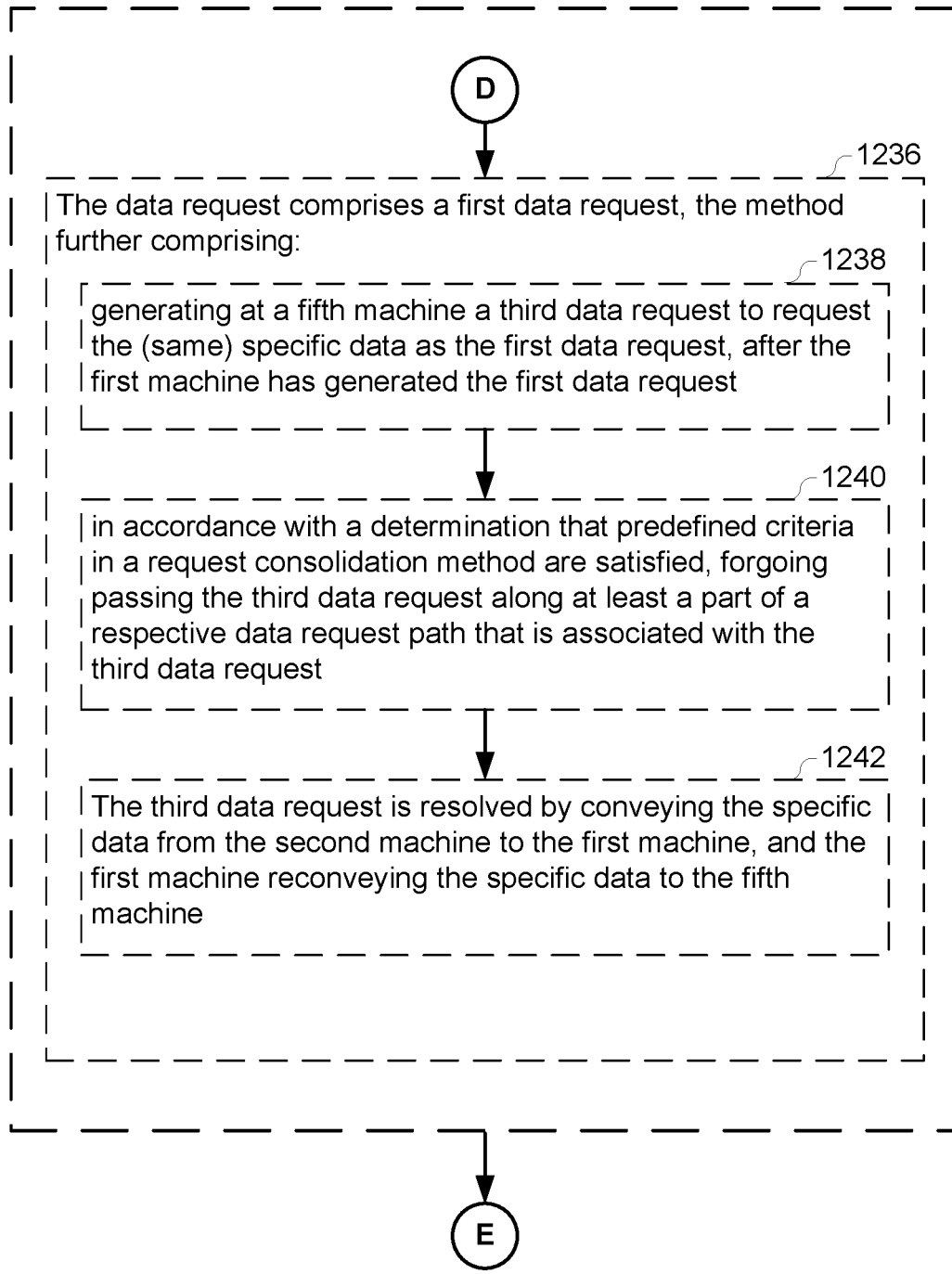
Figure 12F:
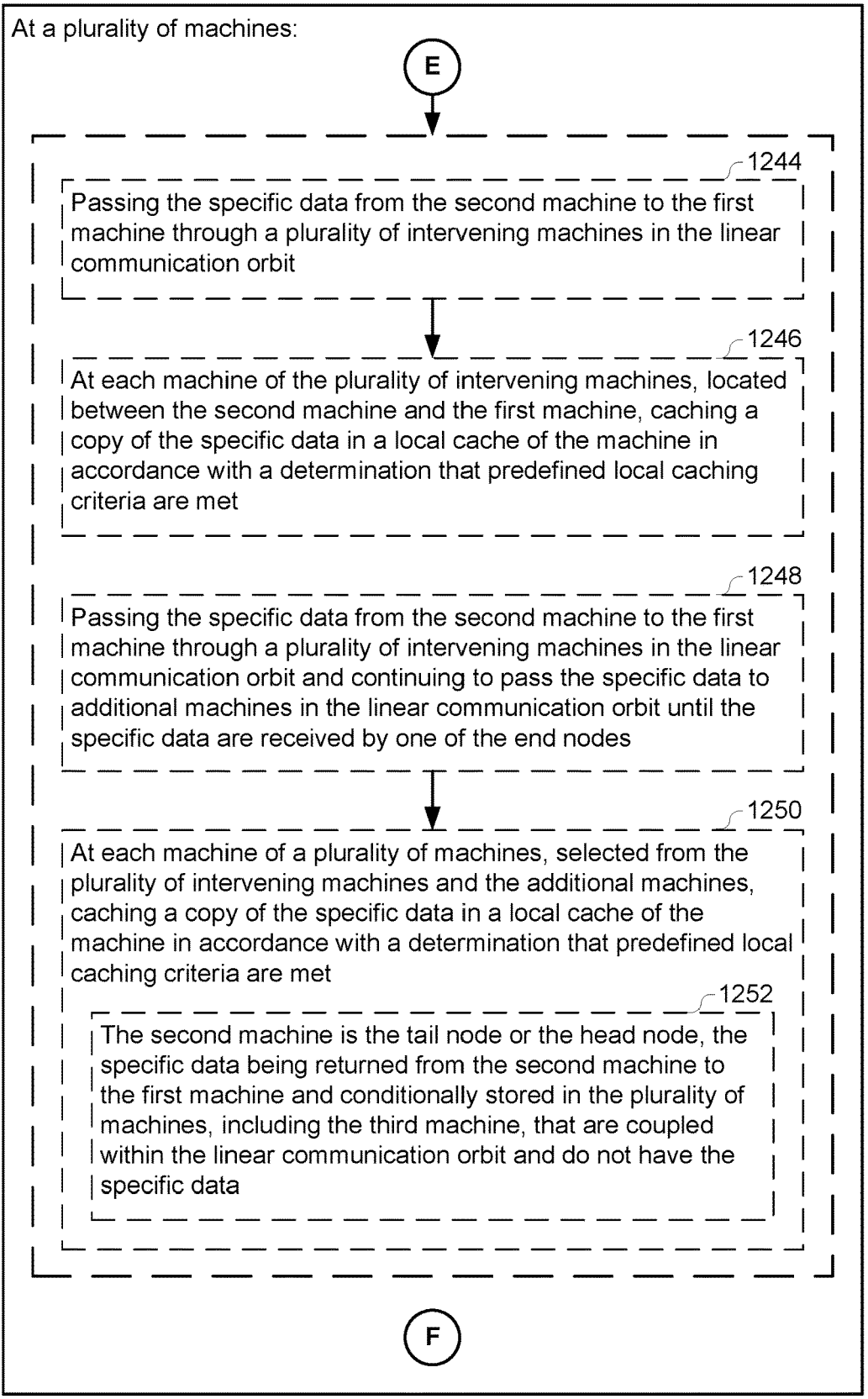

FIG. 10B illustrates a conceptual block diagram of another linear communication orbit 1010 that distributes and caches specific data in accordance with some embodiments. In this example, requester machine 1002 is located downstream of intermediate machine 1004 and head node 1008, and in some embodiments, requester machine 1002 is the tail node of linear communication orbit 1010. In some circumstances, none of the machines included in linear communication orbit 1010 has a copy of the specific data, and therefore, when head node 1008 receives the data request, it requests the specific data from a server. When head node 1008 receives the specific data from the server, it functions similarly as data machine 1006 in FIG. 10A by returning the specific data to the next machine downstream of head node 108.

Therefore, as shown in FIGS. 10A-10B, when head node 1008 receives a data request generated by requester machine 1002, it functions as data machine 1006 by either providing a copy of the requested data that is already stored in its local cache or requesting a copy of the requested data from a server and then providing to requester machine 1002 the copy of the requested data received from the server (by forwarding the data to the next machine in the downstream direction).

FIGS. 11A-11D include a flow diagram representing a method 1100 for caching and distributing specific data in accordance with some embodiments. Method 1100 is, optionally, governed by instructions that are stored in a non-transitory computer readable storage medium and that are executed by one or more processors of a computational machine (e.g., machine 600). Each of the operations shown in FIGS. 11A-11D may correspond to instructions stored in a computer memory or non-transitory computer readable storage medium (e.g., memory 604a of machine 600 in FIG. 6A). The computer readable storage medium may include a magnetic or optical disk storage device, solid-state storage devices such as Flash memory, or other non-volatile memory device or devices. The instructions stored on the computer readable storage medium may include one or more of: source code, assembly language code, object code, or other instruction format that is interpreted by one or more processors. Some operations in method 1100 may be combined and/or the order of some operations may be changed.

Method 1100 is performed by a computational machine that has a local cache. The computational machine receives (1102) from a first machine a data request that is used to request specific data. In some embodiments, the specific data comprises (1104) one of a plurality of shards of an object, such as a software application, software application update, software patch, database, or database update. In some implementations, the computational machine and the first machine are interconnected (1106) by a single local area network. In some implementations, the computational machine and the first machine are two machines of a set of machines in a linear communication orbit, all of which are interconnected by a single local area network.

After receiving the data request, the computational machine determines (1108) whether the computational machine stores the specific data in the local cache of the computational machine. When the computational machine determines that the specific data are not stored in its local cache, it responds (1110) to the data request by passing (1112) the data request to a second machine. Additionally, in response to the data request, when the second machine returns the specific data to the computational machine, the computational machine returns (1114) the specific data to the first machine, and also determines (1114) whether to store the specific data in its local cache according to a data caching method.

In some embodiments, the data caching method includes (1116) a statistically random method of determining whether to cache respective data received from another machine. In some embodiments, the data caching method is determined (1118) based on at least one of the size of the specific data, the size of the local cache, the size of available caches in a linear communication orbit that includes the computational machine, and the size of a respective data set (e.g., an object, or a set of objects) that includes the specific data. As a specific example, a probability of caching the specific data at the computational machine is determined in accordance with a ratio between the size of the local cache and the size of an object, of which the requested specific data is a shard. In another example, a probability of caching the specific data at the computational machine is determined in accordance with a ratio between the size of the local cache and the size of the requested specific data. In either of these examples, larger local caches have higher probability of storing a particular specific data (e.g., shard) than smaller local caches. Additional details and examples of the data caching method are explained above with reference to FIGS. 3A-3C.

In some circumstances, when the computational machine determines (1120) that the specific data are stored in its local cache, it responds to the data request by returning the specific data to the first machine. Stated another way, it responds by a sending a copy of the specific data, obtained from its local cache, to the first machine.

Under some circumstances, the data request comprises (1122) a first data request, and method 1100 includes additional operations to consolidate the first data request with a second data request. To be specific, the computational machine receives (1124) the second data request, after receiving the first data request, to request the same specific data as the first data request. For example, the second data request is initiated (1126) by a third machine distinct from the first machine.

After receiving the second data request, the computational machine determines whether predefined criteria in a request consolidation method are satisfied. In accordance with a determination that the criteria are satisfied, the computational machine forgoes (1128) passing the second data request to the second machine. In other words, the second data request is consolidated with the first data request that requests the same specific data by the computational machine. From another perspective, not reflected in FIGS. 11A-11D, request consolidation is performed at a computational machine having a local cache when, after generating a first data request that is used to request specific data, and passing the data request to a second machine, the computation machine receives, from a third machine, a second data request to request the same specific data. In this method, in accordance with a determination that predefined criteria are satisfied (e.g., that the first data request is still outstanding, waiting for a response), the computational machine forgoes passing the second data request to the second machine. Furthermore, when the second machine returns the specific data to the computational machine, the computational machine returns the specific data to the third machine. Thus, the second data request is consolidated at the computational machine which earlier generated a data request for the same data as the later received second data request. In some embodiments, the computational machine is (1130) is a head node of a linear communication orbit that is organized from a plurality of machines, including the computational machine and the first machine, based on a set of rules at a specific time. In this circumstance, the second machine is a server coupled to the head node.

In some embodiments, the computational machine is (1132) an intermediate machine between neighboring machines within a linear communication orbit. The linear communication orbit is organized from a plurality of machines based on a set of rules at a specific time and subject to changes in configuration and membership when one or more machines join or exit the linear communication orbit. In one specific example, the computational machine is (1134) a downstream of the first machine and upstream of the second machine in the linear communication orbit. In another specific example, the computational machine is (1136) a downstream of the second machine and upstream of the first machine in the linear communication orbit. For corresponding examples, see FIGS. 3A and 3B and the description above of these figures.

It should be understood that the particular order in which the operations in FIGS. 11A-11D have been described are merely exemplary and are not intended to indicate that the described order is the only order in which the operations could be performed. One of ordinary skill in the art would recognize various ways to cache and distribute specific data as described herein. Additionally, it should be noted that details of other processes described herein with respect to method 1200 (e.g., FIGS. 12A-12G) are also applicable in an analogous manner to method 1100 described above with respect to FIGS. 11A-11D. For brevity, these details are not repeated here.

FIGS. 12A-12G include a flow diagram representing another method for caching and distributing specific data in accordance with some embodiments. Method 1200 is, optionally, governed by instructions that are stored in a non-transitory computer readable storage medium and that are executed by one or more processors of a plurality of computational machines (e.g., machine 600). Each of the operations shown in FIG. 12 may correspond to instructions stored in the computer memory or computer readable storage medium (e.g., memory 604a of machine 600 in FIG. 6A) of each of the plurality of computational machines. The computer readable storage medium may include a magnetic or optical disk storage device, solid-state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in method 1200 may be combined and/or the order of some operations may be changed.

Method 1200 is performed by a plurality of computational machines that are included in a linear communication orbit. As described above, the linear communication orbit terminates at two end nodes that include a head node and a tail node. In some embodiments, the plurality of machines that are included in the linear communication orbit are interconnected (1202) by a single local area network. Additionally, in some embodiments, the linear communication orbit is organized (1204) from the plurality of machines based on a set of rules at a first time and subject to changes in configuration and membership when one or more machines join or exit the linear communication orbit.

A first machine included in the plurality of machines generates (1206) a data request to request specific data. In some implementations, the specific data comprises (1208) one of a plurality of shards of an object, such as a software application, software application update, database, or database update. Thus, the specific data is requested for the purpose of installing the software application or database, or updating the software application or database, in the first machine.

A plurality of the machines pass (1210) the data request along a data request path that tracks the linear communication orbit until the request is received at a second machine, in the linear communication orbit, that returns the specific data in response to the data request. In some situations, the second machine comprises (1212) a machine, in the linear communication orbit, that has a cached copy of the specific data in its local cache. However, in other situations, when no machine in the request path has a cached copy of the specific data in its local cache, the second machine is (1212) the head node. In that circumstance, the head node sends the data request for the specific data to a server that is coupled to the head node, and receives a copy of the specific data returned by the server.

In some embodiments, the second machine is (1214) a machine closest, along the data request path, to the first machine that has a cached copy of the specific data in its local cache.

Additionally, in some implementations, passing the data request includes (1216) passing the data request along the data request path that tracks the linear communication orbit until (A) the request is received at a machine, in the linear communication orbit, that has a cached copy of the specific data in a local cache of the machine or (B) the request is received at the head node, which obtains and returns the specific data in response to the request.

After the data request is passed along the data request path, a third machine conditionally stores (1218) the specific data in a local cache of the third machine according to a data caching method, as described above. The third machine is located between the first machine and the second machine in the linear communication orbit.

In some embodiments, the data caching method includes (1220) a statistically random method of determining whether to cache respective data received from another machine. In some embodiments, the specific data comprises (1222) one of a plurality of shards in an object (i.e., where the plurality of shards together form, or can be combined to form, the object), the specific data is to be cached in the linear communication orbit, and the data caching method is (1222) based on at least one of the size of the specific data (e.g., the size of a particular shard), the size of the object (e.g., the total size of the plurality of shards that when combined form the object), the size of the local cache of the third machine, a total size of available caches in the linear communication orbit, and a total size of a data set that includes the object. More details and examples on the data caching method are explained above with reference to FIGS. 3A-3C and 11B (e.g., operations 1116, 1118).

In some circumstances, the data request generated by the first machine (e.g., at 1206) is a first data request, and the specific data is first specific data. Method 1200 includes (1224) additional operations to regenerate or reconstitute an object that is to be installed or updated at the first machine. In accordance with these additional operations, the first machine also generates (1226) a second data request to request second specific data. The second data request is passed (1228) along the data request path until the second data request is received at a fourth machine, in the linear communication orbit, that returns the second specific data in response to the second data request. In operation 1228, the fourth machine is distinct from the second machine. However, in some circumstances, the same second machine has locally cached copies of both the first specific data and second specific data, in which case the fourth machine is the same machine as the second machine. When the first machine receives the plurality of specific data, including the first and second specific data, it combines (1230) the plurality of specific data to generate the object for use at the first machine.

In some embodiments, the plurality of specific data comprise (1232) shards of an object specified in a manifest. For example, in some implementations, the manifest is received by the first machine with, or as a result of receiving, a system management message or data distribution command. The manifest includes a list of shards that, when combined, form the object to be installed. However, as described above, in some implementations or circumstances the manifest is a file or object obtained by the first machine in response to a request generated by the first machine. As described above, the first machine may generate the request for the manifest in response to a message received from a server (e.g., by evaluating a rule include in a server management message), in response to an event in an application executed by the first machine (e.g., an automated procedure that checks for application updates), in response to a user command, etc.

In some other implementations, the manifest is referenced by a command or system management message received by the first machine, and the first machine sends a data request to obtain a copy of the manifest, using the same methodology as described above with reference to FIGS. 11A-11D to obtain any other specific data. Upon receiving the manifest, the first machine proceeds to generate and transmit data requests for the shards listed in the manifest. In some embodiments, generating the first data request by the first machine includes (1234) delaying generation of the first data request with respect to time at which the manifest is received by the first machine in accordance with a predefined request spreading method.

Under some circumstances, where the data request (see operation 1206) comprises a first data request, method 1200 includes (1236) additional operations to consolidate the first data request and a third data request when both request the same specific data. In accordance with these additional operations, a fifth machine generates (1238) the third data request to request the same specific data as the first request, after the first machine has generated the first data request. When predefined criteria in a request consolidation method are satisfied (e.g., where the first data request is still outstanding at the time the first machine receives the third data request, and both request the same specific data), the plurality of machines in the linear communication orbit forgo (1240) passing the third data request along at least a part of a respective data request path that is associated with the third data request. In these circumstances, the third data request is resolved (1242) by conveying the specific data from the second machine to the first machine, and then the first machine conveying the specific data (from the first machine) to the fifth machine.

Additionally, in some embodiments, method 1200 further comprises passing (1244) the specific data from the second machine to the first machine through a plurality of intervening machines in the linear communication orbit. Each machine of the plurality of intervening machines, located between the second machine and the first machine, caches (1246) a copy of the specific data in a local cache of the machine if (i.e., in accordance with a determination that) predefined local caching criteria are met. Stated another way, a copy of the specific data is locally cached at a subset of the intervening machines, and each intervening machine independently determines whether it should locally cache a copy of the specific data in accordance with the predefined local caching criteria.

However, in some situations, the specific data not only are passed (1248) from the second machine to the first machine through a plurality of intervening machines in the linear communication orbit, but also continue (1248) to be passed to additional machines in the linear communication orbit (e.g., machines upstream or downstream of the first machine), until the specific data are received by one of the end nodes, i.e., the head node or the tail node. A plurality of machines are selected from the plurality of intervening machines and the additional machines. Each of the plurality of machines caches (1250) a copy of the specific data in a local cache of the machine in accordance with a determination that predefined local caching criteria are met. In those situations in which the second machine is (1252) the tail node or the head node, the specific data are returned from the second machine to the first machine and conditionally stored in the plurality of machines, including the third machine (see discussion above re 1218-1222), that are coupled within the linear communication orbit and do not have the specific data (i.e., do not already have a locally cached copy of the specific data).

In one specific example, the second machine is (1254) a downstream machine between the first machine and the tail node. The data request is passed downstream from the first machine to the second machine, and the specific data are returned upstream from the second machine to the first machine. Similarly, in another specific example, the second machine is (1256) an upstream machine between the first machine and the head node, and the data request is passed from the first machine downstream to the tail node and then upstream to the second machine, and the specific data are returned downstream from the second machine to the first machine.

It should be understood that the particular order in which the operations in FIGS. 12A-12G have been described are merely exemplary and are not intended to indicate that the described order is the only order in which the operations could be performed. One of ordinary skill in the art would recognize various ways to reorder the operations described herein. Additionally, it should be noted that details of other processes described herein with respect to method 1100 (e.g., FIGS. 11A-11D) are also applicable in an analogous manner to method 1100 described above with respect to FIGS. 12A-12G. For brevity, these details are not repeated here.

The foregoing description has been provided with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles disclosed and their practical applications, to thereby enable others to best utilize the disclosure and various embodiments with various modifications as are suited to the particular use contemplated.

What is claimed is:

1. A method of facilitating software updates, comprising:
    at a server system in a distributed system comprising a plurality of computational machines in addition to the server system:
        receiving a master update from a remote server outside the distributed system;
        generating, from the master update, a first group of update metadata comprising a subset of the received master update, comprising less than all of master update; and
        sending, to a first plurality of the computational machines in the distributed system, first update materials via a linear communication orbit, the first update materials including the first group of update metadata and first filter criteria specifying characteristics of computational machines that are to locally store the first group of update metadata, wherein the linear communication orbit comprises a linearly arranged sequence of computational machines configured to sequentially convey messages to each computational machine in the linearly arranged sequence of computational machines in the linear communication orbit,
        wherein each respective computational machine of a first set of the computational machines, comprising computational machines in the first plurality of computational machines that satisfy the first filter criteria, locally stores the first group of update metadata, obtains first update files based on the first group of update metadata, and updates one or more software programs using the first update files.

2. The method of claim 1, wherein the first plurality of computational machines to which the first update materials are sent include computational machines that satisfy the first filter criteria and computational machines that do not satisfy the first filter criteria.

3. The method of claim 1, including receiving update metadata from a plurality of remote servers outside the distributed system and generating, from the master update and the received update metadata, multiple distinct groups of update metadata, including a first group of update metadata and a second group of update metadata, for distinct software products or categories of software products.

4. The method of claim 1, wherein the first group of update metadata includes applicability rules for evaluating, at a respective computational machine of the first set of computational machines that satisfy the first filter criteria, software version information for one or more software programs already installed at the respective computational machine so as to identify updates that have not yet been applied to the one or more software programs.

5. The method of claim 4, wherein the software version information identifies one or more software programs already installed at the respective computational machine, and prior updates that have been applied to the one or more software programs.

6. The method of claim 1, wherein the first group of update metadata includes applicability rules for evaluating, at a respective computational machine of the first set of computational machines that satisfy the first filter criteria, applicability rules for evaluating software version information for one or more software programs already installed at the respective computational machine so as to identify one or more groups of software update files corresponding to updates that have not yet been applied to the one or more software programs already installed at the respective computational machine.

7. The method of claim 1, including generating, from the master update, multiple distinct groups of update metadata, including a first group of update metadata and a second group of update metadata, for distinct software products or categories of software products.

8. The method of claim 7, including
    sending to a second plurality of computational machines in the distributed system second update materials, including the second group of update metadata and second filter criteria specifying characteristics of computational machines that are to locally store the second group of update metadata, wherein the second plurality of computational machines to which the second update materials are sent include computational machines that satisfy the second filter criteria and computational machines that do not satisfy the second filter criteria;
    wherein each respective computational machine of a second set of computational machines, comprising computational machines in the second plurality of computational machines that satisfy the second filter criteria, locally stores the second group of update metadata, obtains second update files based on the second group of update metadata, and updates one or more software programs using the second update files.

9. The method of claim 1, wherein the linear communication orbit includes computational machines at two end nodes, comprising a head node and a tail node, and the linear communication orbit is coupled to the server system via at least one of the computational machines at the two end nodes.

10. The method of claim 1, wherein each respective computational machine of the first set of computational machines that satisfy the first filter criteria is configured to:
  execute a plurality of software programs;
  execute a local server distinct from the plurality of software programs;
  at the local server, receive, via the linear communication orbit, the first group of update metadata;
  at one or more modules executed by the respective computational machine, the one or more modules distinct from the local server and the plurality of software programs,
    receive the first group of update metadata from the local server; and
    evaluate software version information using the first group of update metadata to determine a set of one or more updates to be applied to one or more of the plurality of software programs;
  send, via the linear communication orbit, one or more requests so as to request one or more software update files corresponding to the set of one or more updates;
  receive the one or more software update files corresponding to the set of one or more updates; and
  update the one or more of the software programs by applying the received one or more software update files to the one or more of the software programs.

11. The method of claim 10, wherein sending the one or more requests and receiving the software update files corresponding to the set of one or more updates comprises a set of operations, including:
  sending, via the linear communication orbit, one or more file manifest requests for file manifests corresponding to the set of one or more updates;
  receiving, via the linear communication orbit, in response to the one or more file manifest requests, one or more file manifests corresponding to the set of one or more updates;
  identifying, from the received one or more file manifests, a plurality of individual update files that are not locally stored at the respective computational machine;
  sending, via the linear communication orbit, one or more shard requests for individual update files not locally stored at the respective computational machine;
  receiving, via the linear communication orbit, in response to the shard requests, the requested individual update files; and
  generating at least one of the software update files corresponding to the set of one or more updates, wherein the generating includes combining individual update files received in response to the shard requests and individual update files, if any, already locally stored at the respective computational machine.

12. The method of claim 11, wherein a respective file manifest of the one or more file manifests corresponds to two or more of the individual update files, which comprise shards of a respective software update file that when combined, form the respective software update file.

13. The method of claim 11, wherein, prior to the respective computational machine sending the one or more shard requests, a first plurality of the individual update files are, in aggregate, locally cached at other computational machines, other than the respective computational machine, in the linear communication orbit, and wherein the individual update files received by the respective computational machine in response to the shard requests include the first plurality of the individual update files, received from the other computational machines in the linear communication orbit that have locally cached one or more of the first plurality of the individual update files.

14. A server system, comprising:
  one or more processors;
  memory storing one or more programs, the one or more programs including instructions, that when executed by the server system, which is in a distributed system comprising a plurality of computational machines in addition to the server system, cause the server system to perform operations including:
    receiving a master update from a remote server outside the distributed system;
    generating, from the master update, a first group of update metadata comprising a subset of the received master update, comprising less than all of master update; and
    sending, to a first plurality of the computational machines in the distributed system, first update materials via a linear communication orbit, the first update materials including the first group of update metadata and first filter criteria specifying characteristics of computational machines that are to locally store the first group of update metadata, wherein the linear communication orbit comprises a linearly arranged sequence of computational machines configured to sequentially convey messages to each computational machine in the linearly arranged sequence of computational machines in the linear communication orbit, wherein each respective computational machine of a first set of the computational machines, comprising computational machines in the first plurality of computational machines that satisfy the first filter criteria, locally stores the first group of update metadata, obtains first update files based on the first group of update metadata, and updates one or more software programs using the first update files.

15. The server system of claim 14, wherein the first plurality of computational machines to which the first update materials are sent include computational machines that satisfy the first filter criteria and computational machines that do not satisfy the first filter criteria.

16. The server system of claim 14, wherein the one or more programs include instructions for receiving update metadata from a plurality of remote servers outside the distributed system and generating, from the master update and the received update metadata, multiple distinct groups of update metadata, including a first group of update metadata and a second group of update metadata, for distinct software products or categories of software products.

17. The server system of claim 14, wherein the first group of update metadata includes applicability rules for evaluating, at a respective computational machine of the first set of computational machines that satisfy the first filter criteria, software version information for one or more software programs already installed at the respective computational machine so as to identify updates that have not yet been applied to the one or more software programs.

18. The server system of claim 17, wherein the software version information identifies one or more software programs already installed at the respective computational machine, and prior updates that have been applied to the one or more software programs.

19. A non-transitory computer readable storage medium storing one or more programs for execution by a server system having one or more processors and memory storing one or more programs, the one or more programs including instructions, that when executed by the one or more processors, cause the server system, which is in a distributed system comprising a plurality of computational machines in addition to the server system, to perform operations including:

receiving a master update from a remote server outside the distributed system;

generating, from the master update, a first group of update metadata comprising a subset of the received master update, comprising less than all of master update; and sending, to a first plurality of the computational machines in the distributed system, first update materials via a linear communication orbit, the first update materials including the first group of update metadata and first filter criteria specifying characteristics of computational machines that are to locally store the first group of update metadata, wherein the linear communication orbit comprises a linearly arranged sequence of computational machines configured to sequentially convey messages to each computational machine in the linearly arranged sequence of computational machines in the linear communication orbit, wherein each respective computational machine of a first set of the computational machines, comprising computational machines in the first plurality of computational machines that satisfy the first filter criteria, locally stores the first group of update metadata, obtains first update files based on the first group of update metadata, and updates one or more software programs using the first update files.

20. The non-transitory computer readable storage medium of claim 19, wherein the first plurality of computational machines to which the first update materials are sent include computational machines that satisfy the first filter criteria and computational machines that do not satisfy the first filter criteria.

21. The non-transitory computer readable storage medium of claim 19, the operations further comprising:

receiving update metadata from a plurality of remote servers outside the distributed system, and generating, from the master update and the received update metadata, multiple distinct groups of update metadata, including a first group of update metadata and a second group of update metadata, for distinct software products or categories of software products.

22. The non-transitory computer readable storage medium of claim 19, wherein the first group of update metadata includes applicability rules for evaluating, at a respective computational machine of the first set of computational machines that satisfy the first filter criteria, software version information for one or more software programs already installed at the respective computational machine so as to identify updates that have not yet been applied to the one or more software programs.

23. The non-transitory computer readable storage medium of claim 22, wherein the software version information identifies one or more software programs already installed at the respective computational machine, and prior updates that have been applied to the one or more software programs.

24. The non-transitory computer readable storage medium of claim 19, wherein the first group of update metadata includes applicability rules for evaluating, at a respective computational machine of the first set of computational machines that satisfy the first filter criteria, applicability rules for evaluating software version information for one or more software programs already installed at the respective computational machine so as to identify one or more groups of software update files corresponding to updates that have not yet been applied to the one or more software programs already installed at the respective computational machine.

25. The non-transitory computer readable storage medium of claim 19, the operations further comprising:

generating, from the master update, multiple distinct groups of update metadata, including a first group of update metadata and a second group of update metadata, for distinct software products or categories of software products;

sending to a second plurality of computational machines in the distributed system second update materials, including the second group of update metadata and second filter criteria specifying characteristics of computational machines that are to locally store the second group of update metadata, wherein the second plurality of computational machines to which the second update materials are sent include computational machines that satisfy the second filter criteria and computational machines that do not satisfy the second filter criteria;

wherein each respective computational machine of a second set of computational machines, comprising computational machines in the second plurality of computational machines that satisfy the second filter criteria, locally stores the second group of update metadata, obtains second update files based on the second group of update metadata, and updates one or more software programs using the second update files.

* * * * *